(12) United States Patent
Jones et al.

(10) Patent No.: US 10,346,378 B1
(45) Date of Patent: Jul. 9, 2019

(54) DATA STORAGE ARCHITECTURE FOR AN ENTERPRISE COMMUNICATION SYSTEM

(71) Applicant: Slack Technologies, Inc., San Francisco, CA (US)

(72) Inventors: Leah Jones, San Francisco, CA (US); Keith Adams, San Francisco, CA (US); Samantha Stoller, San Francisco, CA (US); Maude Lemaire, San Francisco, CA (US); Eric Vierhaus, San Francisco, CA (US); Ilan Frank, Los Altos, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 16/206,652

(22) Filed: Nov. 30, 2018

(51) Int. Cl.
| | |
|---|---|
| *G06F 7/00* | (2006.01) |
| *G06F 17/30* | (2006.01) |
| *G06F 16/22* | (2019.01) |
| *G06F 16/27* | (2019.01) |
| *H04L 12/58* | (2006.01) |
| *H04L 29/08* | (2006.01) |

(52) U.S. Cl.
CPC .......... *G06F 16/2228* (2019.01); *G06F 16/27* (2019.01); *H04L 51/04* (2013.01); *H04L 67/1097* (2013.01); *H04L 67/306* (2013.01)

(58) Field of Classification Search
CPC .......... G06F 16/2365; G06F 16/24524; G06F 16/24568
See application file for complete search history.

(56) References Cited

U.S. PATENT DOCUMENTS

| | | | |
|---|---|---|---|
| 6,248,946 B1 | 6/2001 | Dwek | |
| 6,374,336 B1 * | 4/2002 | Peters | ................. G06F 11/1076 711/167 |
| 6,718,361 B1 * | 4/2004 | Basani | ................ H04L 67/1095 707/999.01 |
| 7,426,540 B1 | 9/2008 | Matsumoto et al. | |
| 7,644,144 B1 | 1/2010 | Horvitz et al. | |
| 7,730,094 B2 | 6/2010 | Kaler et al. | |
| 8,185,448 B1 | 5/2012 | Myslinski | |
| 9,160,550 B1 | 10/2015 | Morrison et al. | |

(Continued)

OTHER PUBLICATIONS

Slackline-Shared Channels across Slack teams [online][retrieved Oct. 2, 2017]. Retrieved from the Internet: <URL: https://web.archive.org/web/20170630031530/https://slackline.io/>. (Jun. 30, 2017) 4 pages.

(Continued)

*Primary Examiner* — Hasanul Mobin
(74) *Attorney, Agent, or Firm* — Alston & Bird LLP

(57) ABSTRACT

Various embodiments are directed to group-based data storage systems configured for maintaining data exchanged between client devices within channel-specific shards each corresponding with one or more group-identifiers to provide group-based access to those channel-specific shards and for applying group-specific policies for data stored within those channel-specific shards. Membership of particular users within particular groups and within particular channels may be monitored such that access to particular channel shards may be controlled based on group-memberships of the users, and access to data stored within particular channel shards may be controlled based on channel-memberships of the users.

21 Claims, 8 Drawing Sheets

(56) References Cited

U.S. PATENT DOCUMENTS

| | | | |
|---|---|---|---|
| 9,940,394 B1 | 4/2018 | Grant et al. | |
| 2003/0084020 A1* | 5/2003 | Shu | G06F 11/1076 |
| 2005/0171811 A1 | 8/2005 | Campbell et al. | |
| 2006/0041661 A1 | 2/2006 | Erikson et al. | |
| 2007/0261102 A1* | 11/2007 | Spataro | G06F 21/604 |
| | | | 726/2 |
| 2008/0104665 A1 | 5/2008 | Naldurg et al. | |
| 2008/0183975 A1* | 7/2008 | Foster | G06F 11/1076 |
| | | | 711/153 |
| 2010/0246535 A1 | 9/2010 | Lindner | |
| 2011/0137991 A1 | 6/2011 | Russell | |
| 2012/0246228 A1 | 9/2012 | Udezue et al. | |
| 2013/0325962 A1 | 12/2013 | Verma et al. | |
| 2014/0012814 A1* | 1/2014 | Bercovici | G06F 16/273 |
| | | | 707/636 |
| 2015/0169253 A1* | 6/2015 | Donlan | G06F 3/0604 |
| | | | 711/161 |
| 2015/0282102 A1* | 10/2015 | Kakishima | H04W 52/40 |
| | | | 370/329 |
| 2015/0358234 A1 | 12/2015 | Krieger | |
| 2016/0259797 A1 | 9/2016 | Lewis et al. | |
| 2016/0306854 A1* | 10/2016 | Hegde | G06F 16/22 |
| 2017/0103116 A1* | 4/2017 | Hu | G06F 16/213 |
| 2017/0109013 A1 | 4/2017 | Hong | |
| 2017/0169800 A1 | 6/2017 | Greco et al. | |
| 2018/0046730 A1* | 2/2018 | De Lavarene | G06F 16/972 |
| 2018/0197144 A1 | 7/2018 | Frank et al. | |
| 2018/0314750 A1* | 11/2018 | Merriman | G06F 16/278 |
| 2019/0028287 A1 | 1/2019 | Jin et al. | |

OTHER PUBLICATIONS

Quinde—Share channels between Slack teams [online][retrieved Oct. 2, 2017]. Retrieved from the Internet: <URL: https://quinde.io/>. 3 pages.

ISA/206—Invitation to Pay Additional Fees dated Aug. 29, 2018 for WO Application No. PCT/US18/043101.

International Search Report and Written Opinion for corresponding International Application No. PCT/US2018/043101, dated Nov. 8, 2018, 15 pages.

Frequent questions—Slackline [online][retrieved Oct. 2, 2017]. Retrieved from the Internet: <URL: https://web.archive.org/web/20170606091157/https://slackline.io/faqs>. (Jun. 6, 2017) 3 pages.

* cited by examiner

| id | username | email | create | password | confirmed | profile |
|---|---|---|---|---|---|---|
| 1002 | todd | todd@corp.com | 1512602588 | secret1 | 1 | {"display_name":"Todd Nodd"} |
| 1006 | joe | joe@mega.com | 1512602588 | secret2 | 1 | {"display_name":"Joe Smoe"} |

FIG. 4

| user_id | team_id | created | is_admin | is_owner |
|---|---|---|---|---|
| 1002 | 1001 | 1512602689 | 1 | 1 |
| 1006 | 1003 | 1512603008 | 0 | 0 |
| 1006 | 1004 | 1512603008 | 0 | 0 |
| 1006 | 1005 | 1512603008 | 0 | 0 |

FIG. 5

| user_id | channel_id | team_id | created | last_read | is_open | channel_type |
|---|---|---|---|---|---|---|
| 1002 | 2001 | 1001 | 1512602689 | 1512603008 | 0 | 1 |
| 1006 | 2002 | 1003 | 1512602689 | 1512603008 | 0 | 1 |
| 1006 | 2003 | 1004 | 1512602689 | 1512603008 | 0 | 1 |
| 1006 | 2004 | 1005 | 1512602689 | 1512603008 | 0 | 1 |

FIG. 6

| id | name | date_create | team_id | enterprise_id | creator_id | topic | purpose | privacy_type |
|---|---|---|---|---|---|---|---|---|
| 2001 | Corp General | 1512602234 | 1001 | 0 | 1002 | | | pub |
| 2002 | Mega General | 1512602234 | 1003 | 0 | 1006 | | | pub |
| 2003 | Mega HR | 1512602234 | 1004 | 1003 | 1006 | | | priv |
| 2004 | Mega Engineering | 1512602234 | 1005 | 1003 | 1006 | | | pub |

FIG. 7

| id | name | date_create | admin_user_id | enterprise_id | is_enterprise |
|---|---|---|---|---|---|
| 1001 | Non-Grid Team | 1512602234 | 1002 | 0 | 0 |
| 1003 | Grid Organization | 1512602234 | 1006 | 0 | 1 |
| 1004 | Grid Team A | 1512602234 | 1006 | 1003 | 0 |
| 1005 | Grid Team B | 1512602234 | 1006 | 1003 | 0 |

FIG. 8

| channel_id | team_id | created | share_type | privacy_type |
|---|---|---|---|---|
| 2001 | 1001 | 1512602689 | 0 | pub |
| 2002 | 1003 | 1512603008 | 0 | pub |
| 2003 | 1004 | 1512603008 | 0 | priv |
| 2004 | 1005 | 1512603008 | 1 | pub |
| 2004 | 1001 | 1512603008 | 1 | pub |

FIG. 9

DATA STORAGE ARCHITECTURE FOR AN ENTERPRISE COMMUNICATION SYSTEM

BACKGROUND

Systems have been provided for facilitating communications among a plurality of individuals via message exchange across client devices connected with a centralized messaging system.

Through applied effort, ingenuity, and innovation many deficiencies of such systems have been solved by developing solutions that are in accordance with the embodiments of the present invention, many examples of which are described in detail herein.

BRIEF SUMMARY

Scalability of communication systems, particularly those communication systems specifically configured for facilitating communication between individuals of a common enterprise, may be improved by managing various communication channels within these sorts of communication systems across multiple hardware systems (e.g., servers, databases, and/or the like). However, to maintain desired levels of security and to prevent unauthorized access to communication channels, even in embodiments in which communication channels associated with entirely independent enterprises are at least partially managed by common hardware devices, access to these communication channels are limited to particular users having access to an enterprise to which a particular communication channel is related.

Certain embodiments are directed to a group-based data storage system accessible by a plurality of client devices. In certain embodiments, the group-based data storage system comprises: a plurality of discrete memory storage databases, wherein each of the plurality of discrete memory storage databases are sharded into a plurality of data shards comprising channel-specific shards, wherein each of the plurality of channel-specific shards have an associated channel identifier; and a remote computing platform correlating each channel identifier with one or more group identifiers and controlling access to each of the plurality of channel-specific shards based at least in part on channel membership and group membership by: receiving an access request from a client device to access data stored on one or more channel-specific shards; determining channel membership and group membership for the client device; providing the client device with access to data stored in one or more channel-specific shards having associated channel identifiers and group identifiers matching the client device's channel membership and group membership.

In certain embodiments, a first channel-specific shard of the plurality of channel-specific shards has a plurality of corresponding group identifiers each associated with one of a plurality of groups; and the remote computing platform is configured to: provide access to channel settings stored in the first channel-specific shard for client devices having membership in at least one of the plurality of groups.

Moreover, the remote computing platform may be further configured to: receive a channel query from the client device; and provide the client device with a listing of one or more channels matching the channel query and stored within corresponding channel-specific shards having a corresponding group identifier matching the client device's group membership.

In certain embodiments, determining channel membership and group membership for the client device comprises: determining a user identifier associated with the client device; querying a user-specific database shard corresponding with the user identifier to identify one or more channel identifiers and one or more group identifiers associated with the user identifier.

In various embodiments, the remote computing platform is further configured to provide a client device with access to data stored in a plurality of channel-specific shards having channel identifiers and group identifiers matching the client device's channel membership and group membership in real-time.

Moreover, the remote computing platform may be further configured to apply group-based policies to one or more channel-specific shards by: determining one or more group identifiers associated with the channel-specific shard; querying group-specific database shards corresponding to each of the one or more group identifiers associated with the channel-specific shard to identify one or more group-based policies applicable to the channel-specific shards; and adjusting channel settings stored within the channel-specific shard to comply with the one or more group-based policies. In certain embodiments, the group-based policies comprise enterprise-based policies, and wherein: querying group-specific database shards comprises identifying one or more enterprise identifiers associated with each of the group-specific database shards; and adjusting channel settings comprises adjusting channel settings stored within the channel-specific shard to comply with one or more enterprise-based policies associated with the one or more enterprise identifiers.

Various embodiments are directed to a method for managing a group-based storage system accessible via a plurality of client devices, the method comprising: sharding a plurality of discrete memory storage databases into a plurality of data shards comprising channel-specific shards, wherein each of the plurality of channel-specific shards have an associated channel identifier correlated with one or more group identifiers; and controlling access to each of the plurality of channel-specific shards by one or more client devices based at least in part on channel membership and group membership by: receiving an access request from a client device to access data stored on one or more channel-specific shards; determining channel membership and group membership for the client device; providing the client device with access to data stored in one or more channel-specific shards having associated channel identifiers and group identifiers matching the client device's channel membership and group membership.

In certain embodiments, a first channel-specific shard of the plurality of channel-specific shards has a plurality of corresponding group identifiers each associated with one of a plurality of groups; and the method may further comprise: providing access to channel settings stored in the first channel-specific shard for client devices having membership in at least one of the plurality of groups.

In certain embodiments, the method further comprises: receiving a channel query from the client device; and providing the client device with a listing of one or more channels matching the channel query and stored within corresponding channel-specific shards having a corresponding group identifier matching the client device's group membership.

In certain embodiments, determining channel membership and group membership for the client device comprises: determining a user identifier associated with the client device; and querying a user-specific database shard corresponding with the user identifier to identify one or more channel identifiers and one or more group identifiers associated with the user identifier.

Moreover, the method may further comprise: providing a client device with access to data stored in a plurality of channel-specific shards having channel identifiers and group identifiers matching the client device's channel membership and group membership in real-time.

In various embodiments, the method may further comprise: applying group-based policies to one or more channel-specific shards by: determining one or more group identifiers associated with the channel-specific shard; querying group-specific database shards corresponding to each of the one or more group identifiers associated with the channel-specific shard to identify one or more group-based policies applicable to the channel-specific shards; and adjusting channel settings stored within the channel-specific shard to comply with the one or more group-based policies. Moreover, the group-based policies comprise enterprise-based policies, and wherein: querying group-specific database shards may comprise identifying one or more enterprise identifiers associated with each of the group-specific database shards; and adjusting channel settings may comprise adjusting channel settings stored within the channel-specific shard to comply with one or more enterprise-based policies associated with the one or more enterprise identifiers.

Certain embodiments are directed to a computer program product for managing a group-based storage system accessible via a plurality of client devices, the computer program product comprising at least one non-transitory computer-readable storage medium having computer-readable program code portions stored therein, the computer-readable program code portions may comprise an executable portion configured to: shard a plurality of discrete memory storage databases into a plurality of data shards comprising channel-specific shards, wherein each of the plurality of channel-specific shards have an associated channel identifier correlated with one or more group identifiers; and control access to each of the plurality of channel-specific shards by one or more client devices based at least in part on channel membership and group membership by: receiving an access request from a client device to access data stored on one or more channel-specific shards; determining channel membership and group membership for the client device; providing the client device with access to data stored in one or more channel-specific shards having associated channel identifiers and group identifiers matching the client device's channel membership and group membership.

In certain embodiments, a first channel-specific shard of the plurality of channel-specific shards has a plurality of corresponding group identifiers each associated with one of a plurality of groups; and wherein the computer program product further comprises an executable portion configured to: provide access to channel settings stored in the first channel-specific shard for client devices having membership in at least one of the plurality of groups.

In certain embodiments, the computer program product further comprises an executable portion configured to: receive a channel query from the client device; provide the client device with a listing of one or more channels matching the channel query and stored within corresponding channel-specific shards having a corresponding group identifier matching the client device's group membership.

In various embodiments, determining channel membership and group membership for the client device comprises: determining a user identifier associated with the client device; querying a user-specific database shard corresponding with the user identifier to identify one or more channel identifiers and one or more group identifiers associated with the user identifier.

In certain embodiments, the computer program product further comprises an executable portion configured to: provide a client device with access to data stored in a plurality of channel-specific shards having channel identifiers and group identifiers matching the client device's channel membership and group membership in real-time.

Moreover, the computer program product may further comprise an executable portion configured to apply group-based policies to one or more channel-specific shards by: determining one or more group identifiers associated with the channel-specific shard; querying group-specific database shards corresponding to each of the one or more group identifiers associated with the channel-specific shard to identify one or more group-based policies applicable to the channel-specific shards; and adjusting channel settings stored within the channel-specific shard to comply with the one or more group-based policies. Moreover, the group-based policies may comprise enterprise-based policies, and wherein: querying group-specific database shards comprises identifying one or more enterprise identifiers associated with each of the group-specific database shards; and adjusting channel settings comprises adjusting channel settings stored within the channel-specific shard to comply with one or more enterprise-based policies associated with the one or more enterprise identifiers.

Various embodiments are directed to a group-based data storage system accessible by a plurality of client devices, the group-based data storage system comprising: a plurality of discrete memory storage databases collectively defining a plurality of user shards and a plurality of channel shards; wherein: each channel shard of the plurality of channel shards has an associated channel identifier and stores data exchanged between client devices in association with the channel identifier; and each user shard of the plurality of user shards corresponds to a single user identifier of a plurality of user identifiers, and each user shard identifies channel memberships for the single user by channel identifier; a remote computing platform configured to control access to each of the plurality of channel shards by a client device associated with a particular user identifier of the plurality of user identifiers based at least in part on a user shard of the plurality of user shards corresponding with the particular user identifier.

In certain embodiments, the remote computing platform is further configured for controlling channel membership based at least in part on group membership, such that channel identifiers stored in a user shard have an associated group identifier matching a group identifier associated with the user identifier of the user shard.

In certain embodiments, the group-specific shards comprise first group-specific shards each corresponding to an enterprise group and second group-specific shards each corresponding to a subgroup; each of the second group-specific shards comprise hierarchy data comprising a group identifier corresponding to one of the first group-specific shards; and the linking data links the new shard with one or more of the second group-specific shards. In various embodiments, each of the first group-specific shards comprise data indicative of enterprise channel creation parameters, and wherein the remote computing platform is further configured to populate the new shard with data indicative of one or more of the enterprise channel creation parameters. Moreover, the remote computing platform may be configured as a group-based communication platform configured to facilitate message exchange between the plurality of client devices.

Moreover, each user shard of the plurality of user shards may further identify group memberships for the single user by group identifier, and the remote computing platform is further configured to control access to channel settings stored within each of the plurality of channel shards by the client device associated with the particular user identifier based at least in part on group identifiers stored within the channel-shards and the user shard corresponding with the particular user identifier.

In certain embodiments, the plurality of discrete memory storage databases further define a plurality of group shards; wherein: each group shard of the plurality of group shards corresponds to a single group identifier of a plurality of group identifiers, and each group shard identifies group policies for the single group identifier; each channel shard further stores channel settings in association with a corresponding channel identifier and identifies one or more group identifiers associated with the corresponding channel identifier; and the remote computing platform is further configured to maintain compliance of channel settings relative to group policies associated with group identifiers associated with corresponding channel identifiers.

Certain embodiments are directed to a group-based communication platform storing communication channels associated with a common group in separate database shards by: associating data for a plurality of communication channels, stored in separate database shards, with a common group; associating one or more user profiles with the common group; maintaining a membership listing of user profiles associated with each of the plurality of communication channels, wherein access to a communication channel is limited to listed members of that communication channel, and only members of a particular communication channel's group may be added to the listing of members for a particular communication channel; and transmitting, from the group-based communication platform to at least one client device corresponding to a user profile, data for a plurality of communication channels retrieved from a plurality of separate database shards.

In certain embodiments, the group-based communication platform is configured to store, in a memory storage area, a data table identifying members of the common group by associating user profiles with a group identifier corresponding to the common group, and wherein access to one or more communication channels associated with the common group is limited to user profiles associated with the common group. Moreover, database shards storing data relating to a particular group/team may span multiple database shards stored on multiple physical database storage devices. Thus, the platform may be configured to retrieve data from multiple database shards to be transmitted to a client device simultaneously. In certain embodiments, the platform is configured to transmit data retrieved from a plurality of database shards via a single websocket connection to the client device.

In various embodiments, the group-specific shards comprise first group-specific shards each corresponding to an enterprise group and second group-specific shards each corresponding to a subgroup; each of the second group-specific shards comprise hierarchy data comprising a group identifier corresponding to one of the first group-specific shards; and the linking data links the new shard with one or more of the second group-specific shards. Moreover, in certain embodiments, each of the first group-specific shards comprise data indicative of enterprise channel creation parameters, and wherein sharding the plurality of discrete memory storage databases further comprises populating the new shard with data indicative of one or more of the enterprise channel creation parameters.

Certain embodiments are directed to a group-based data storage system accessible by a plurality of client devices. In various embodiments, the group-based data storage system comprises: a plurality of discrete memory storage databases, wherein each of the plurality of discrete memory storage databases are sharded into a plurality of data shards comprising: channel-specific shards each having an associated channel identifier; group-specific shards each having an associated group identifier; and user-specific shards each having an associated user identifier; and a remote computing platform configured for sharding the plurality of discrete memory storage databases to generate new data shards of the plurality of data shards by: receiving a channel creation request from a client device associated with a given user identifier; generating a new shard within one of the plurality of discrete memory storage databases corresponding to the channel creation request; populating the new shard with linking data linking the new shard with one or more linked group-specific shards of the one or more group-specific shards and one or more linked user-specific shards of the one or more user-specific shards; and populating the one or more linked group-specific shards and the one or more linked user-specific shards with data identifying the new shard.

In various embodiments, the new shard is a new channel-specific shard, and the one or more linked group-specific shards are linked with a plurality of channel-specific shards stored on a plurality of discrete memory storage databases. In various embodiments, the new shard is a new channel-specific shard, and wherein the remote computing platform is configured to enforce access control to the new shard based at least in part on the linking data. Moreover, the remote computing platform may be configured to enforce access control to the new shard by: enforcing a first access level for users based on the linked group-specific shards; and enforcing a second access level for users based on the linked user-specific shards. Moreover, in certain embodiments, each of the one or more linked group-specific shards identifies user-specific shards corresponding to members of the group-specific shard, and wherein the first access level enables members of the one or more linked group-specific shards to view identifying data corresponding to the new shard. In various embodiments, the second access level enables users associated with each of the one or more linked user-specific shards to access contents of the new shard. In certain embodiments, the remote computing platform is further configured to: receive an access request from a client device associated with one of the one or more linked user-specific shards; determine channel membership and group membership for the client device; and provide the client device with access to data stored in the new shard upon determining that the client device channel membership encompasses the new shard.

Various embodiments are directed to a computer program product for managing a group-based storage system accessible via a plurality of client devices, the computer program product comprising at least one non-transitory computer-readable storage medium having computer-readable program code portions stored therein, the computer-readable program code portions comprising an executable portion configured to: shard a plurality of discrete memory storage databases into a plurality of data shards comprising: channel-specific shards each having an associated channel identifier; group-specific shards each having an associated group identifier; and user-specific shards each having an associated user identifier; and wherein sharding the plurality of discrete memory storage databases comprises: receiving a channel creation request from a client device associated with a given user identifier; generating a new shard within one of the plurality of discrete memory storage databases corresponding to the channel creation request; populating the new shard with linking data linking the new shard with one or more linked group-specific shards of the one or more group-specific shards and one or more linked user-specific shards of the one or more user-specific shards; and populating the one or more linked group-specific shards and the one or more linked user-specific shards with data identifying the new shard.

In certain embodiments, the new shard is a new channel-specific shard, and the one or more linked group-specific shards are linked with a plurality of channel-specific shards stored on a plurality of discrete memory storage databases.

Moreover, the new shard may be a new channel-specific shard, and wherein the remote computing platform is configured to enforce access control to the new shard based at least in part on the linking data. In certain embodiments, the computer-readable program code portions comprise an executable portion are configured to enforce access control to the new shard by: enforcing a first access level for users based on the linked group-specific shards; and enforcing a second access level for users based on the linked user-specific shards.

Moreover, each of the one or more linked group-specific shards may identify user-specific shards corresponding to members of the group-specific shard, and wherein the first access level enables members of the one or more linked group-specific shards to view may identify data corresponding to the new shard. In various embodiments, the second access level enables users associated with each of the one or more linked user-specific shards to access contents of the new shard. In certain embodiments, the computer-readable program code portions comprising an executable portion are configured to: receive an access request from a client device associated with one of the one or more linked user-specific shards; determine channel membership and group membership for the client device; and provide the client device with access to data stored in the new shard upon determining that the client device channel membership encompasses the new shard.

Certain embodiments are directed to a group-based data storage system accessible by a plurality of client devices. In certain embodiments, the group-based data storage system comprises: a plurality of discrete memory storage databases, wherein each of the plurality of discrete memory storage databases are sharded into a plurality of data shards collectively comprising: a plurality of channel shards each having an associated channel identifier of a plurality of channel identifiers and each storing data exchanged between client devices in association with the channel identifier; a plurality of group shards each having an associated group identifier, wherein each group shard of the plurality of group shards stores data indicative of channel creation authorization for new channels associated with the group shard; and a plurality of user shards each having an associated user identifier of a plurality of user identifiers and each user shard identifying channel membership and group membership for the associated user identifier; and a remote computing platform configured to control channel creation authorization for new channel shards requested by a client device associated with a particular user identifier of the plurality of user identifiers based at least in part on a group shard of the plurality of group shards corresponding with the particular user identifier.

In various embodiments, each group shard of the plurality of group shards corresponds to a single group identifier of a plurality of group identifiers, and each group shard identifies group policies for the single group identifier; each channel shard further stores channel settings in association with a corresponding channel identifier and identifies one or more group identifiers associated with the corresponding channel identifier; and the remote computing platform is further configured to maintain compliance of channel settings associated with new channels relative to group policies associated with group identifiers associated with corresponding channel identifiers.

Moreover, in certain embodiments, data indicative of channel creation authorization stored within each group shard comprises data indicative of one or more user identifiers authorized for channel creation. Moreover, the plurality of group shards may comprise a plurality of first group shards relating to enterprise groups, and a plurality of second group shards relating to subgroups; and wherein: each of the second group shards may comprise enterprise data identifying a group identifier corresponding to one of the first group shards relating to an associated enterprise group; and wherein data indicative of channel creation authorization for new channels associated with each of the second group shards may at least partially match data indicative of channel creation authorization for new channels associated with the one of the first group shards relating to the associated enterprise group.

Certain embodiments are directed to a computer program product for managing a group-based storage system accessible via a plurality of client devices, the computer program product comprising at least one non-transitory computer-readable storage medium having computer-readable program code portions stored therein, the computer-readable program code portions comprising an executable portion configured to: shard a plurality of discrete memory storage databases into a plurality of data shards comprising: a plurality of channel shards each having an associated channel identifier of a plurality of channel identifiers and each storing data exchanged between client devices in association with the channel identifier; a plurality of group shards each having an associated group identifier, wherein each group shard of the plurality of group shards stores data indicative of channel creation authorization for new channels associated with the group shard; and a plurality of user shards each having an associated user identifier of a plurality of user identifiers and each user shard identifying channel membership and group membership for the associated user identifier; and control channel creation authorization for new channel shards requested by a client device associated with a particular user identifier of the plurality of user identifiers based at least in part on a group shard of the plurality of group shards corresponding with the particular user identifier.

In certain embodiments, each group shard of the plurality of group shards corresponds to a single group identifier of a plurality of group identifiers, and each group shard identifies group policies for the single group identifier; each channel shard further stores channel settings in association with a corresponding channel identifier and identifies one or more group identifiers associated with the corresponding channel identifier; and the computer-readable program code portions comprise further executable portions configured to maintain compliance of channel settings associated with new channels relative to group policies associated with group identifiers associated with corresponding channel identifiers.

Moreover, data indicative of channel creation authorization stored within each group shard may comprise data indicative of one or more user identifiers authorized for channel creation. In certain embodiments, the plurality of group shards comprises a plurality of first group shards relating to enterprise groups, and a plurality of second group shards relating to subgroups; and wherein: each of the second group shards comprises enterprise data identifying a group identifier corresponding to one of the first group shards relating to an associated enterprise group; and wherein data indicative of channel creation authorization for new channels associated with each of the second group shards at least partially matches data indicative of channel creation authorization for new channels associated with the one of the first group shards relating to the associated enterprise group.

BRIEF DESCRIPTION OF THE SEVERAL VIEWS OF THE DRAWINGS

Reference will now be made to the accompanying drawings, which are not necessarily drawn to scale, and wherein:

FIGS. 4-9 are example data tables utilized to facilitate data associations between data stored in a plurality of disparate storage locations;

DETAILED DESCRIPTION

Figure 1:
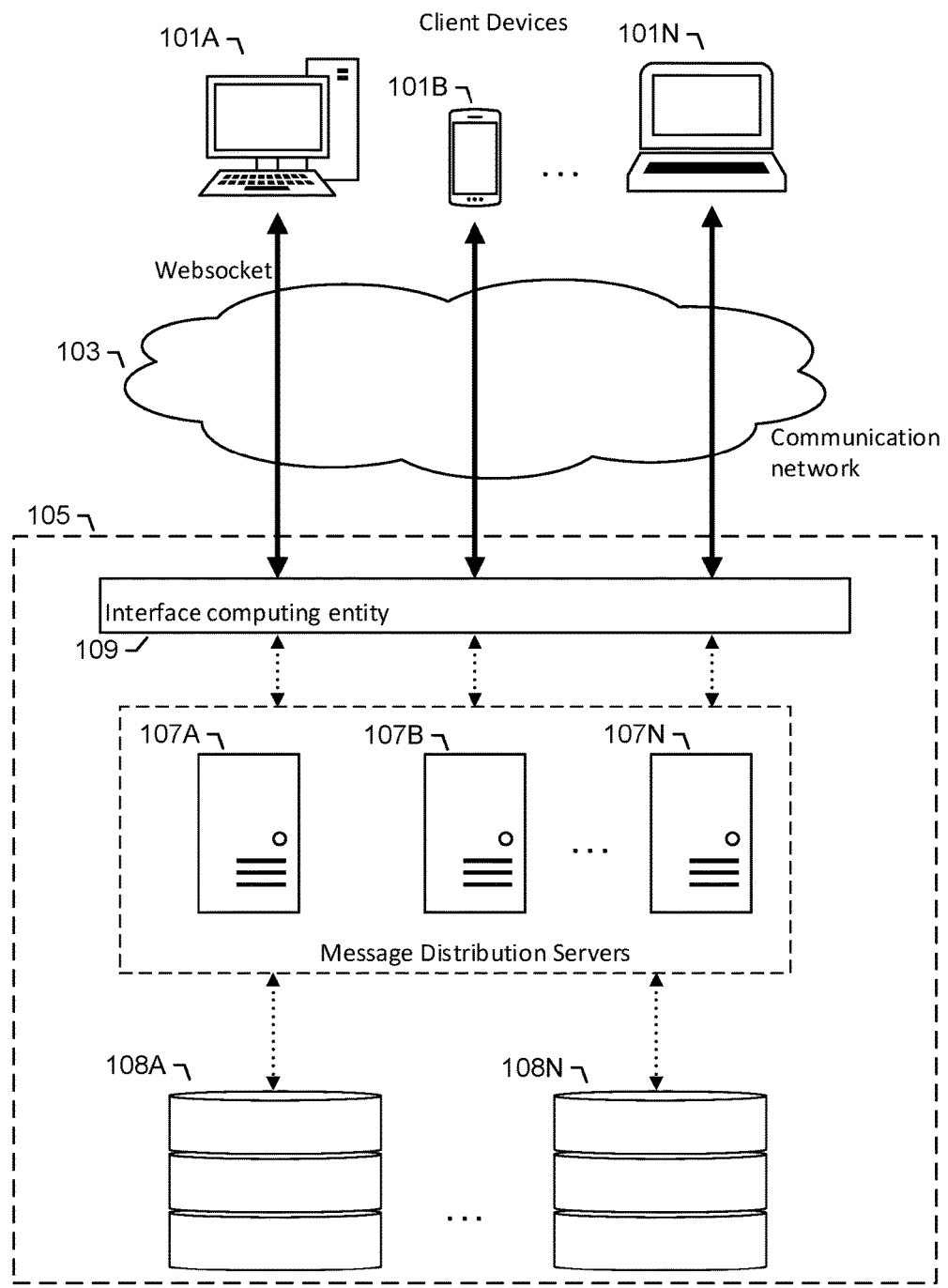
FIG. 1 shows a schematic view of a group-based communication platform in communication with client devices according to another embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments are configured for automatically storing and retrieving data (e.g., messages) exchanged between a plurality of client devices through corresponding communication channels from a plurality of disparate sharded database storage locations. Each communication channel may be associated with a unique sharded database storage location, and a plurality of these sharded database storage locations may be associated relative to one another via one or more datatables to collectively form one or more group-based communication grids. Thus, data relating to a particular organization (or other group) that spans multiple communication channels may be stored across a plurality of database shards collectively forming an organization's (or other group's) communication grid, thereby avoiding data storage limitations and/or latency issues associated with storing a large amount of data associated with a single group with hardware database storage device(s). These communication grids may be hierarchical in nature to provide hierarchical administrative policies for channels encompassed thereby, such as those discussed in U.S. application Ser. No. 15/782,680, filed Oct. 12, 2017, the contents of which are incorporated herein by reference in their entirety. Moreover, multiple communication grids (or portions of communication grids) may overlap via one or more shared communication channels, which enable cross-grid communications between members of multiple discrete group-based communication grids. Various embodiments enable group-specific (or enterprise-specific) administrative policies for those shared channels, enabling shared channels to remain subject to the same group-specific administrative policies even when shared externally with other groups (which may be subject to different, potentially conflicting administrative policies).

Moreover, the administrative policies are applied to any newly generated channels relating to particular groups (e.g., group-specific administrative policies) and/or particular enterprises (e.g., enterprise-specific administrative policies), as well as existing channels relating to particular groups and/or particular enterprises. Thus, if administrative policies are updated after generation of corresponding channels, channel settings associated with each of the corresponding channels may be updated to comply with the updated administrative policies.

Thus, the group-based communication platform utilizes channel-based sharding strategies to store data, such that data associated with particular communication channels are stored in corresponding database shards identified based at least in part on the channel identifier associated with the communication channel. However, the group-based communication platform is additionally configured to limit access to the stored channel-specific data based on a particular user's association with one or more groups. Thus, access to communication channel data within a particular group (inclusive of messages exchanged within communication channels, the identity and/or existence of the communication channels themselves, and other data associated with particular communication channels) may be selectably isolated to identified members of the particular group without a need for discrete and separate data storage areas for each group. Thus, a plurality of separate groups (and their associated communication channels) may all reap substantially similar access speed and storage availability benefits by mutually sharing a collective database storage area divided into individual database shards assigned to particular communication channels, while retaining desirable access control limitations to prevent unauthorized users from accessing existing communication channels and/or to prevent authorized users from establishing unauthorized communication channels with other, unauthorized users.

Moreover, various embodiments maintain capabilities for applying hierarchical administrative policies for channels encompassed within a communication grid, thereby maintaining desirable consistency between administrative policies for channels accessible to a particular organization associated with the communication grid. Overall, the configurations discussed herein significantly ease horizontal scaling strategies for data stored in association with a particular group while maintaining desirable data access-limitations and administrative policies, without significant latency concerns resulting from increasing data storage requirements.

Moreover, client devices utilized to exchange data via these communication channels may be configured to integrate communication interfaces providing easy access to a plurality of communication channels associated with different groups, subgroups, enterprises, and/or the like. The client devices may be further configured to consolidate data shared within particular cross-group communication channels associated with a particular user to provide a multi-group consolidated view of a particular communication channel associated with multiple groups that are also associated with the user.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, grid, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers associated with communication channels that the user has been granted access to, one or more group identifiers for groups with which the user is associated, an indication as to whether the user is an owner/administrator of any communication channels, an indication as to whether the user is an owner/administrator of any groups, an indication as to whether the user has any communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

In certain embodiments, data indicative of a user's identity and data indicative of the user's communication channel membership may be stored in separate storage locations, such as separate data storage tables. As an example, a user profile may comprise data such as a unique user identifier, a username associated with a user, alternative communication information for the user (e.g., an email address), a password for the user, a creation date for the user profile, a display name for the user, and/or the like. Such data may be stored in a data table, such as the users table shown in FIG. 4. As shown in the embodiment of FIG. 4, the user data stored within the users table may not provide an indication of group or channel memberships for the users. Instead, one or more separate data tables may be indicative of other user account details, such as group memberships for the user, communication channel memberships for the user, and/or the like. For example, a user-group table, such as shown in FIG. 5 provides an association between individual users (listed by corresponding unique user identifiers) and teams/groups (identified by unique group identifiers). The user-group data table may comprise additional data, such as the date/time at which a particular user joined a particular group, and one or more indications of whether a particular user is a group administrator having administrator or ownership privileges for a particular group. Details regarding particular groups may be stored separately in group profiles stored within a group data table, discussed herein. Thus, by referencing the unique user identifier from the user profile within the communication channel table, the group-based communication platform (described in further detail below) provides additional user account details indicative of the user's membership in particular communication channels and/or groups.

Similarly, membership of users within particular communication channels (discussed herein) may be established/maintained via a channel-member data table, such as that shown in FIG. 6. The channel-member data table provides an association between individual users (listed by corresponding unique user identifiers) and communication channels (identified by unique channel identifiers). The channel-member data table may comprise additional data, such as a unique group identifier associated with the channel, a date/time at which a particular user joined a particular communication channel, a date/time the user last read the contents of a communication channel, an indication of whether a particular communication channel is open/currently active on the user's client device, a channel type, an indication as to whether the user's access to a particular communication channel is restricted (and the level of restriction associated with the user's access to a particular communication channel), and/or the like.

In certain embodiments, users may be considered "restricted" users or "ultra-restricted" users of a particular communication channel. Whereas normal, "unrestricted" users may have full read and write access to the communication channel—thereby enabling those users to read messages exchanged via the communication channel and to write new messages for exchange via the communication channel, restricted users may be prevented from writing new messages for exchange via the communication channel, while those users still have read access of messages exchanged via the communication channel. Ultra-restricted users may have further access privileges, for example, based on additional functionality associated with communication channels. For example, restricted users may be enabled to select reactions to exchanged messages, whereas ultra-restricted users may not have reaction-selection privileges for messages within the communication channel. Distinctions between unrestricted, restricted, and ultra-restricted users may be particularly useful in enterprise-wide communication channels having a large number of channel members. Only a subset of the users may be identified as unrestricted users (e.g., for providing enterprise-wide announcements), whereas other users may only have access to read the messages of those unrestricted users, and to select reactions (if enabled).

The terms "group administrator," "group admin," "team administrator," or "team admin" refers to credentials or identifiers associated with user profile that indicate that a client device associated with the user profile may edit access channel settings of respective groups and group-based communication channels having identifiers associated with the user profile. In some embodiments, group administrators transmit channel creation requests to the group-based communication platform to create group-based communication channels for a particular group. Users identified as group administrators may edit the access control rights to a group or group-based communication channel which the group is a part of. Group administrators may also add users to the group or group-based communication channel which the group is a part of or to invite users to a group or group-based communication channel which the group is a part of. The access control parameters editable by the group administrator may be limited by the settings set by a super administrator.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a unique user identifier, which may be referenced in one or more data tables providing an electronic indication that suggests a group (e.g., a user group) and/or communication channel to which the user of the client device belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users.

The term "channel settings" refers to various defined or definable parameters of a group-based communication channel. The channel settings may comprise a channel identifier, a channel name string, and a channel purpose string.

Multiple communication channels may operate on each of one or more computing devices, and therefore a "communication channel identifier" or "channel identifier" may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

The channel name string refers to a data structure containing a string of alphanumerical characters for identifying a channel in non-technical terms. The channel name string may be identical to a channel identifier, however this is not required in certain embodiments. A channel purpose string refers to a data structure containing a string of alphanumerical characters that indicates to a group-based communication platform and/or a user a purpose of the group-based communications channel. In some examples, a channel purpose string may contain a channel purpose such as "to work on project Nucleus." Channel settings may also include a message retention window that indicates a period of network time during which messages associated with a group-based communication channel are retained within a group-based communication repository. Upon expiration of the period of network time (i.e., the message retention window), a message or file associated with the message retention window may be deleted from a group-based communication repository. Channel settings may also include one or more of a group capacity and a user capacity that, when applicable, indicates the number of groups (or users) authorized to access the particular group-based communication channel; and, when applicable one or more group identifier values that indicate the group identifier(s) of one or more groups authorized to access the group-based communication channel. In some embodiments, if a user associated with a client device attempts to access a group-based communication channel and the user capacity has been reached, the client device may not be permitted to access the group-based communication channel. The channel settings may also include one or more authorized application identifiers that indicate to a group-based communication platform which applications are authorized to be downloaded and utilized in the group-based communication channel. In embodiments, if an application attempts to access a group-based communication channel and the application is not associated with an authorized application identifier, the application may not be granted access to the group-based communication channel.

The communication channel identifier, channel name string, channel purpose, as well as other identifying data and/or other channel characteristics relating to a particular communication channel, may be stored in a channels data table, such as that shown in FIG. 7. The channels data table includes the unique channel identifier for each channel, the channel name (e.g., display name), a date/time the channel was created, a unique group identifier indicating a group (or enterprise) for which the communication channel is related, a unique user identifier for the creator of the channel, textual strings indicative of the assigned channel purpose (which may be displayed to users), and a privacy type for each channel (e.g., whether the channel is public or private within associated groups). As discussed in greater detail herein, data associated with each channel (e.g., messages exchanged within a channel), and data indicative of certain of the channel settings may be stored in a particular database "shard," and accordingly the channels data table may be indicative of a physical address at which the channel data is stored. These database shards may encompass a particular storage location within a physical database storage device. A plurality of database shards, spanning a plurality of physical database storage devices are utilized to store data associated with a plurality of communication channels. It should also be understood that a single physical database storage device may encompass a plurality of database shards thereon. The amount of memory associated with a particular database shard may vary, and may depend on the amount of data associated with a particular communication channel stored within the database shard.

As mentioned above, data regarding communication channel membership may be identified within one or more separate data tables such as the channel-members data table discussed above (which may be sharded into a plurality of database shards based on user identifier), and accordingly the communication channel identifiers may be utilized to associate particular unique user identifiers with access to a particular communication channel as identified by its respective channel identifier. Similarly, data regarding communication channel associations with particular groups may be identified within one or more separate data tables such as the groups-channels data table illustrated in FIG. 9. The groups-channels data table associates unique channel identifiers with unique group identifiers to enable members of a particular group to access data within a particular channel. Channels may be single-group channels (also referred to herein as "intra-group channels") linked with a single group (such as channels "2001," "2002," and "2003" as shown in FIG. 9), or cross-group channels (also referred to herein as "inter-group channels") linked with a plurality of groups (such as channel "2004" as shown in FIG. 9). These cross-group or inter-group channels may additionally be "intra-enterprise channels" (associated with a single enterprise, such that the channel is an inter-group, intra-enterprise channel) or "inter-enterprise channels" (associated with a plurality of enterprises, such that the channel is an inter-group, inter-enterprise channel). The groups-channels data table may further comprise additional data regarding group-channel associations, such as the date a particular channel was linked with a particular group, a share type (e.g., indicating whether a particular channel is a cross-group channel that may be shared across groups), and a privacy type for a particular channel.

A communication channel may be "public," which may allow any client device to join and participate in the information sharing through the communication channel. Public communication channels may still be access limited, for example, to user identifiers associated with a particular group identifier. Thus, in the context of a large organization, public communication channels may be accessible to all employees of the organization (thus having user identifiers corresponding with an identifier associated with the large organization), but those same public communication channels may not be accessible to non-employees of the organization (associated with user identifiers that are not associated with the identifier of the large organization). A communication channel may be "private," which may restrict data communications in the communication channel to certain client devices and/or users.

The term "communication channel interface" refers to a virtual communications environment or feed that is configured to display messaging communications posted by channel members (e.g., validated users accessing the environment using client devices) that are viewable only to the members of the group. The format of the communication channel interface may appear differently to different members of the group-based communication channel; however, the content of the communication channel interface (i.e., messaging communications) will be displayed to each member of the group-based communication channel. For instance, a common set of group-based messaging communications will be displayed to each member of the respective group-based communication channel such that the content of the communication channel interface (i.e., messaging communications) will not vary per member of the group-based communication channel.

As used herein, the terms "messaging communication" and "message" refer to any electronically generated digital content object provided by a user using a client device and that is configured for display within a communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, an object identifier, a group identifier and/or a communication channel identifier. Each of the foregoing identifiers may comprise ASCII text, a pointer, a memory address, and the like.

The term "enterprise" should be understood to refer to a company, organization and the like having a corresponding communication grid. These terms are used interchangeably throughout the disclosure. Enterprises may each encompass a plurality of groups or teams (discussed below), thereby providing a hierarchical structure to the enterprise.

The term "enterprise policies" refers to organizationally defined network parameters, protocols, keys, limits, and policies that enable or confirm specified availability, scalability, performance, compatibility and security levels for an enterprise group-based communication system. Enterprise policies span channel creation, messaging and file usage, invitations, emoji creation, app installs, user profiles and access modes. The enterprise policies regulate all group-based communication channels and all group-based communication channels for the respective organization must comply with the enterprise policies.

"Groups" or "teams" refer to particular organizations, collections of users, or other defining characteristics utilized to associate a plurality of users. Groups or teams may be distinguished based on "group identifiers" or "team identifiers" that refer to one or more items of data by which a group within a group-based communication system may be identified. In certain embodiments, enterprises, as discussed above, may have corresponding group identifiers/team identifiers, such that enterprises may be represented within listings/tables of groups or teams. As an example, a group identifier may comprise ASCII text, a pointer, a memory address, and the like. These group identifiers may be stored within group profiles, which are stored within a group data table, such as that shown in FIG. 8. In the embodiment shown in FIG. 8, the group data table comprises unique group identifiers for each group, a group name for each group, a date/time at which a particular group was created, a unique user identifier having administrative user privileges for a particular group, any preference identifiers, an indication of whether a particular group is an enterprise with an associated group-based communication grid (which may encompass a higher-level grouping, under which a plurality of lower-level subgroups may relate), and a unique group identifier for a higher-level enterprise, if the group is a subgroup. As shown in the example of FIG. 8, the group having identifier "1001" is not considered an enterprise, nor is it related to an enterprise. By contrast, the group having identifier "1003" is considered an enterprise (in certain embodiments, enterprises cannot be associated with any higher level groupings), and groups "1004" and "1005" are individual subgroups within the "1003" enterprise. As mentioned, membership within a particular group (whether considered an enterprise, a subgroup, or a standalone group) may be established/maintained with a separate users-group data table providing associations between individual users and groups.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate groups. Thus, a channel identifier may be provided together with one or more group identifiers to specifically identify where data/messages related to the particular communication channel are stored.

"Group-based communication grids" or "communication grids" refer to organizational collections of a plurality of communication channels collectively servicing an enterprise. Communication grids may have a hierarchical structure, such that enterprises may comprise groups nested therein. In certain embodiments, additional hierarchical levels may be provided, such as sub-groups nested within groups of the enterprise. Communication channels may be associated with any level of the communication grid. For example, communication channels may be associated with the highest-level group (or enterprise), in which case the communication channel may be accessible to all members associated with the group (or enterprise). Alternatively, a communication channel may be associated with a sub-group (or a plurality of sub-groups) such that only members associated with the one or more subgroups may access the communication channel. Members of other subgroups within the enterprise may not have access to the communication channel in this example. Moreover, certain cross-group communication channels may be shared across multiple communication grids. In such instances, a cross-group communication channel may be shared between multiple enterprises, or between a first subgroup associated with a first enterprise and a second subgroup associated with a second enterprise. Cross-group communication channels may be shared among any number of enterprises, subgroups (either nested within a single enterprise or nested within multiple enterprises).

The term "channel creation request" refers to one or more items of data by which a user of a group-based communication platform may request to create a group-based communication channel. The channel creation request may originate from a user's client device. The channel creation request comprises desired channel settings as well as an originator identifier. A channel creation request is discussed herein as being one type of an "access management request."

The term "channel access request" refers to one or more items of data by which a client device of a group-based communication platform may request access to a group-based communication channel via the group-based communication platform. Channel access requests are discussed herein as being another example of access management requests. The channel access request comprises a group-based communication channel identifier. In some embodiments, the channel access request may further comprise a global identifier associated with the requesting client device, a user identifier associated with the requesting client device, and/or a group identifier associated with the requesting client device.

The term "access rights" refers to parameters for controlling the ability of users to view, change, navigate, and execute contents of the group-based communication platform.

The term "invitation to join" refers to one or more items of data by which a client device of a group-based communication platform may provide access (e.g. by sending a group identifier or group-based communication channel identifier) to a group-based communication channel or a group. The invitation to join may comprise a group-based communication channel identifier, a group identifier, a recipient's global identifier and/or a recipient's user identifier.

The term "originator identification" or "originator identifier" refers to one or more items of data by which the originator of a channel creation request or a channel access request may be identified. The originator identification may be an email address, user identifier, global identifier, an IP address, or any other type of information that can identify a requesting entity. In some embodiments the originator identification may include a group identifier, which may uniquely identify a group associated with the originator of the channel creation request or channel access request.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users may join and/or create communication channels. Some communication channels may be globally accessible to those users associated with a particular group identifier (i.e., users who are members of the organization). The communication channel identifier may be used to facilitate access control for a message (e.g., access to the message, such as having the message return as part of search results in response to a search query, may be restricted to those users associated with the communication channel identifier, or who have the ability to join the communication channel). The communication channel identifier may be used to determine context for the message (e.g., a description of the communication channel, such as a description of a project discussed in the communication channel, may be associated with the communication channel identifier).

The term "private communication channel" refers to a communication channel with restricted access such that it is not generally accessible and/or searchable by other members of the group-based communication system. For example, only those users or administrators who have knowledge of and permission to access (e.g., the user identifier of a particular user is associated with a communication channel identifier for the private communication channel after the user has been validated/authenticated) the private communication channel may view content of the private communication channel.

The term "whitelist" should be understood to refer to access control parameters that indicate to a group-based communication platform one or more members of a group-based communication system allowed to take an action (e.g. joining a channel or group). The members may be identified by one or more user identifiers. It should be understood that whitelisting may be provided for specific groups, enterprises, channels, and/or the like. Accordingly whitelists may be stored within group-specific, enterprise-specific, channel-specific, and/or other database shards.

The term "blacklist" should be understood to refer to access control parameters that indicate to a group-based communication platform one or more members of a group-based communication system that are restricted from taking an action (e.g. joining a channel or group). The members may be identified by one or more user identifiers. It should be understood that whitelisting may be provided for specific groups, enterprises, channels, and/or the like. Accordingly blacklists may be stored within group-specific, enterprise-specific, channel-specific, and/or other database shards.

The term "application identifier" refers to one or more items of data that uniquely identify, to a group-based communications server, an application, such as an external application, which may be at least partially executable on a third-party computing system based on data provided from the group-based communication platform.

The term "application install request" refers to one or more items of data that indicate to a group-based communication platform a request to install an application in a group-based communication channel. The application install request can include an enterprise identifier, a group identifier, a user identifier, and/or channel identifier.

The term "application data" refers to one or more items of data that can be used by the group-based communication platform to obtain an application. The application data can include a link or source from which an application may be downloaded and authentication parameters for downloading the application "Interface computing entities" as discussed herein with reference to various embodiments are computing devices (or portions of computing devices) for maintaining communication connections with various client devices. Specifically, interface computing entities may be configured for maintaining websocket connections initiated by each of a plurality of client devices for transmitting messages (e.g., object updates) and corresponding metadata (e.g., comprising object identifiers) in real time between message distribution servers of the group-based communication platform and respective client devices. In certain embodiments, the interface computing entities generate and maintain backend connections with one or more message distribution servers as discussed herein for obtaining messages to be disseminated to the various client devices.

"Message distribution servers" as discussed herein with reference to certain embodiments are computing devices configured for interacting with various client devices (e.g., via an interface computing entity) for receiving and/or disseminating messages among client devices. Message distribution servers may be configured to receive, generate, store (in an associated database), and/or direct messages received from and/or disseminated to users (e.g., via corresponding client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers—gateway servers—may be configured for receiving messages from client devices and/or for transmitting messages to client devices via an interface computing entity. These gateway servers may be in communication with a second subset of message distribution servers—channel servers—configured for collecting messages distributed within communication channels and for storing those messages within a message repository database for indexing and archiving. In certain embodiments, the channel servers may be in communication with the interface computing entities to provide various messages to client devices.

In certain embodiments, one or more of the interface computing entities and/or the message distribution servers may be geographically distributed, for example, to service client devices located geographically proximate the one or more computing entities. However, in certain embodiments the various computing entities (including the interface computing entities and/or the message distribution servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates example computing systems within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of message distribution servers 107A-107N accessible via the communication network 103 via an interface computing entity 109. Collectively, the message distribution servers 107A-107N are configured for receiving messages transmitted from one or more client devices 101A-101N, storing the messages within database storage areas for individual communication channels, and/or for transmitting messages to appropriate client devices 101A-101N via an interface computing entity 109.

Similarly, the interface computing entity 109 (or plurality of interface computing entities 109) may be embodied as a computer or computers as known in the art. In the illustrated embodiment of FIG. 1, the interface computing entity 109 provides for receiving electronic data from various sources, including, but not limited to the client devices 101A-101N (e.g., via websocket communications over the communications network 103) and/or the message distribution servers 107A-107N (e.g., via backend communications). Moreover, the interface computing entity 109 of the illustrated embodiment is also configured to parse metadata provided as a portion of one or more electronic messages, and to direct incoming electronic messages to one or more message distribution servers 107A-107N based at least in part on the content of the metadata associated with the electronic messages and/or to direct outbound electronic messages to one or more client devices 101A-101N based at least in part on the content of the metadata associated with the electronic messages.

The client devices 101A-101N may be any computing device as defined above. Electronic message data exchanged between the message distribution servers 107A-107N and the client devices 101A-101N via the interface computing entity 109 may be provided in various forms and via various methods.

In some preferred and non-limiting embodiments, one or more of the client devices 101A-101N are mobile devices, such as smartphones or tablets. The one or more client devices may execute an "app" to interact with the message distribution servers 107A-107N and/or interface computing entity 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more websockets.

In some preferred and non-limiting embodiments, the client devices 101A-101N may interact with the message distribution servers 107A-107N and/or interface computing entity 109 via a web browser. The client devices 101A-101N may also include various hardware or firmware designed to interact with the message distribution servers 107A-107N and/or interface computing entity 109. Again, via the browser of the client devices 101A-101N, the client devices 101A-101N are configured for communicating with the group-based communication platform 105 via one or more websockets.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

POST/authrequest.php HTTP/1.1
Host: www.server.com
Content-Type: Application/XML
Content-Length: 667
<?XML version="1.0" encoding="UTF-8"?>
<auth_request>
   <timestamp>2020-12-31 23:59:59</timestamp>
   <user_accounts_details>
   <user_account_credentials>
     <user_name>ID_user_1</user_name>
     <password>abc123</password>
     //OPTIONAL <cookie>cookieID</cookie>
     //OPTIONAL
       <digital_cert_link>www.mydigitalcertificate.com/
       JohnDoeDaDoeDoe@gmail.com/mycertifcate.dc</
       digital_cert_link>
     //OPTIONAL <digital_certificate>_DATA_</digital_
       certificate>
   </user_account_credentials>
   </user_accounts_details>
   <client_details>//iOS Client with App and Webkit
   //it should be noted that although several client details
   //sections are provided to show example variants of client
   //sources, further messages will include only on to save
   //space

```
<client_IP>10.0.0.123</client_IP>
<user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201
    Safari/9537.53</user_agent_string>
<client_product_type>iPhone6,1</client_product_type>
<client_serial_number>DNXXX1X1XXXX</client_serial_number>
<client_UDID>3XXXXXXXXXXXXXXXXXXXXXXXD</client_UDID>
<client_OS>iOS</client_OS>
<client_OS_version>7.1.1</client_OS_version>
<client_app_type>app with webkit</client_app_type>
<app_installed_flag>true</app_installed_flag>
<app_name>MSM.app</app_name>
<app_version>1.0</app_version>
<app_webkit_name>Mobile   Safari</client_webkit_name>
<client_version>537.51.2</client_version>
</client_details>
<client_details>//iOS Client with Webbrowser
<client_IP>10.0.0.123</client_IP>
<user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201
    Safari/9537.53</user_agent_string>
<client_product_type>iPhone6,1</client_product_type>
<client_serial_number>DNXXX1X1XXXX</client_serial_number>
<client_UDID>3XXXXXXXXXXXXXXXXXXXXXXXD</client UDID>
<client_OS>iOS</client_OS>
<client_OS_version>7.1.1</client_OS_version>
<client_app_type>web browser</client_app_type>
<client_name>Mobile Safari</client_name>
<client_version>9537.53</client_version>
</client_details>
<client_details>//Android Client with Webbrowser
<client_IP>10.0.0.123</client_IP>
<user_agent_string>Mozilla/5.0 (Linux; U; Android
    4.0.4; en-us; Nexus S Build/IMM76D) AppleWebKit/
    534.30 (KHTML, like Gecko) Version/4.0 Mobile
    Safari/534.30</user_agent_string>
<client_product_type>Nexus S</client_product_type>
<client_serial_number>YXXXXXXXXZ</client_serial_number>
<client_UDID>FXXXXXXXXX-XXXX-XXXX-XXXX-XXXXXXXXXXXX</client_UDID>
<client_OS>Android</client_OS>
<client_OS_version>4.0.4</client_OS_version>
<client_app_type>web browser</client_app_type>
<client_name>Mobile Safari</client_name>
<client_version>534.30</client_version>
</client_details>
<client_details>//Mac Desktop with Webbrowser
<client_IP>10.0.0.123</client_IP>
<user_agent_string>Mozilla/5.0 (Macintosh; Intel Mac
    OS X 10_9_3) AppleWebKit/537.75.14 (KHTML, like
    Gecko) Version/7.0.3 Safari/537.75.14</user_agent_string>
<client_product_type>MacPro5,1</client_product_type>
<client_serial_number>YXXXXXXXXZ</client serial number>
<client_UDID>FXXXXXXXXX-XXXX-XXXX-XXXX-XXXXXXXXXXXX</client_UDID>
<client_OS>Mac OS X</client_OS>
<client_OS_version>10.9.3</client_OS_version>
<client_app_type>web browser</client_app_type>
<client_name>Mobile Safari</client_name>
<client_version>537.75.14</client_version>
</client_details>
<message>
<message_identifier>ID_message_10</message_identifier>
<team_identifier>ID_team_1</team_identifier>
<channel_identifier>ID_channel_1</channel_identifier>
<contents>That is an interesting invention. I have
    attached a copy our patent policy.</contents>
<attachments>patent_policy.pdf</attachments>
</message>
</auth_request>
```

In the illustrated embodiment, the group-based communication platform 105 comprises a plurality of message distribution servers 107A-107N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a Vitess database command, or a MySQL database command similar to the following:

SELECT messageResponses
    FROM MSM_Message
    WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments.

For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution servers 107A-107N. In one embodiment, the message may be indexed such that a messages shared within a particular communication channel are stored separately. In one implementation, messages may be indexed at a plurality of separate distributed repositories (e.g., to facilitate scalability). If there are attachments associated with the message, file contents of the associated files may be used to index such files in the message distribution servers 107A-107N to facilitate searching.

Examples of electronic information exchange among one or more client devices 101A-101N and the group-based communication platform 105 are described below with reference to FIG. 1.

As shown in FIG. 1, the group-based communication platform 105 enables individual client devices 101A-101N to exchange messages with one another via the group-based communication platform 105. To exchange such messages, individual client devices 101A-101N transmit messages (e.g., text-based messages, files, video and/or audio streams, and/or the like) to an interface (e.g., interface computing entity 109) via a communication protocol (e.g., via a websocket, a non-RTM messaging protocol, and/or the like). Those messages are ultimately provided to one or more message distribution servers 107A-107N, which indexes the messages within sharded storage databases 108A-108N (e.g., based on communication channel identifiers transmitted with the message and indicative of the target communication channel for the message) and distributes those messages to the intended recipients (e.g., client devices 101A-101N) of the message. The distributed messages are provided to the recipient client devices 101A-101N via the interface computing entity 109, which maintains websocket connections with individual recipient client devices 101A-101N of the message, and maintains one or more backend connections with the various message distribution servers 107A-107N.

Messages and other data exchanged via the group-based communication platform 105 are stored in a plurality of database shards extending across a plurality of sharded storage databases 108A-108N. The storage location for various messages may be determined based at least in part on the channel in which the message is shared (thus the storage location is determined based at least in part on the channel identifier associated with the message). In certain embodiments, a plurality of channels associated with a particular enterprise, organization, and/or the like may be stored across a plurality of database shards within the sharded storage databases 108A-108N. The message distribution servers may thus utilize a plurality of data tables for identifying a storage location for messages exchanged within a particular channel and for managing access authorization for users to obtain access to messages exchanged within a particular channel.

According to the embodiment of FIG. 1, the client devices 101A-101N are configured to display the received message in contextually-relevant user interfaces available to the user of the client device 101A-101N. For example, messages transmitted from a first client device 101 as a part of a communication channel are displayed in a user interface display window on client devices 101A-101N associated with other members of the communication channel.

To distribute messages to individual client devices 101A-101N, the messages are retrieved from corresponding memory storage shards of the sharded storage databases (e.g., utilizing an index table to direct message distribution servers 107A-107N to retrieve the appropriate messages disseminated within the corresponding communication channel), and are transmitted from the message distribution servers 107A-107N to the interface computing entity 109, which directs all messages destined for respective ones of the client devices 101A-101N, and transmits all of those messages to the client devices 101A-101N over appropriate connections (e.g., websocket connections).

Example Apparatuses Utilized with Various Embodiments

Figure 2:
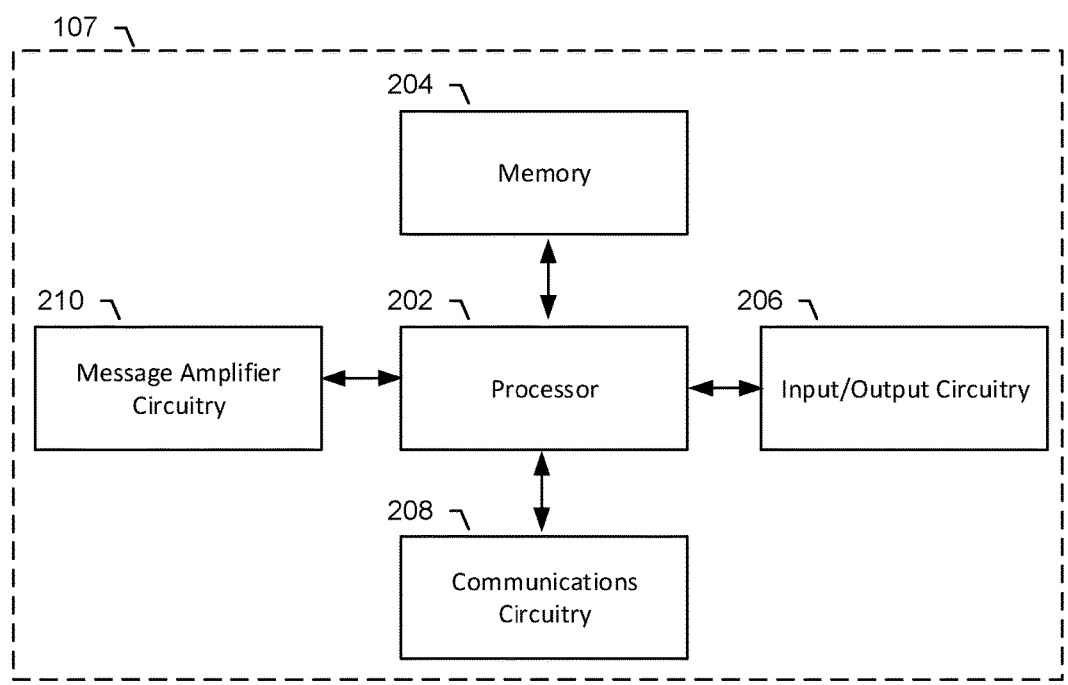
FIG. 2 shows a schematic view of a message distribution server according to one embodiment.

Each message distribution server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described herein with respect to FIGS. 1-9. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. The database may utilize any of a variety of database storage and indexing methodologies, such as those associated with MySQL, Vitess, and/or the like. In certain embodiments, the processor 202 may provide stored and/or indexed messages (e.g., indexed based on key data corresponding to the message and associated database shard to which the message is indexed) to the interface computing entity 109 for dissemination to client devices 101A-101N. The processor 202 may additionally be configured to maintain a reference (e.g., a data table) for indicating where messages relating to particular communication channels are stored. Because data may be sharded to a plurality of discrete storage locations based on channel identifier, the processor 202 may be configured to direct messages to the appropriate storage location once received, and to direct messages from particular database shards to appropriate client devices to disseminate messages exchanged within a particular communication channel.

The database may be embodied as a plurality of physically discrete data storage areas (e.g., each defining one or more database shards), each with unique defining characteristics. For example, each physical discrete data storage area may have an associated physical location, an associated unique identifier, and/or the like. These physically discrete data storage areas may be configured for operating as a cohesive storage unit that may be accessed, for example, by one or more message distribution servers 107A-107N. Moreover, the group-based communication platform 105 may be configured for storing related data, such as messages exchanged within a common communication channel, within a common discrete data storage device. This storage strategy, referred to herein as database sharding, may utilize a plurality of data tables for managing access to the data stored in corresponding database shards (e.g., each shard being utilized to store data relating to a particular communication channel). These data tables may utilize one or more keys (e.g., as utilized in Vitess data storage strategies) to create inter-table references, and to maintain an indication of specific storage locations for data (e.g., storage locations corresponding to particular communication channels). Thus, a plurality of communication channels relating to a single group may be stored within database shards on a plurality of physically discrete database storage devices, thereby enabling horizontal scaling of data stored for a particular group.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 101A-101N to other client devices 101A-101N based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
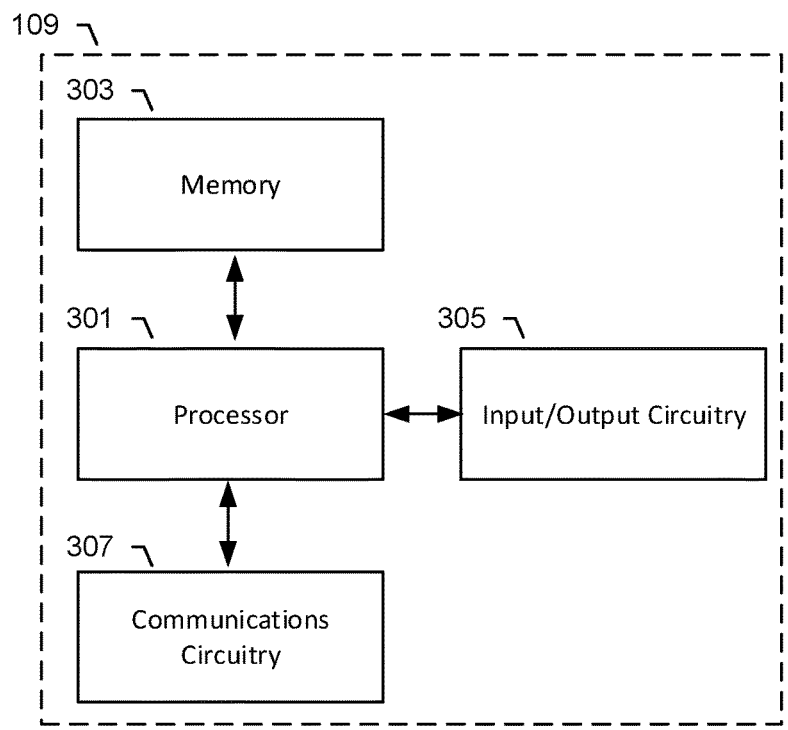
FIG. 3 shows a schematic view of an interface computing entity according to one embodiment.

In the illustrated embodiment of FIG. 3, the interface computing entity 109 is embodied by one or more computing systems encompassing apparatus 300. The illustrated apparatus 300 includes processor 301, memory 303, input/output circuitry 305, and communications circuitry 307. The apparatus 300 may be configured to execute the operations described herein with respect to FIGS. 1-9. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the interface computing entity 109 is shown within the bounds of the group-based communication platform 105, it should be understood that the interface computing entity 109 may be embodied as an edge-based computing device in communication with aspects of the group-based communication platform 105 via a communication network 103. Such embodiments may comprise a plurality of interface computing entities 109 that are geographically distributed, and such interface computing entities 109 may be configured for communicating with client devices 101A-101N within a geographic range proximate a respective interface computing entity 109.

The term "circuitry" should be understood broadly to include hardware and, in some embodiments, software for configuring the hardware. With respect to components of each apparatus 200, 300, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Implementation

The group-based communication platform 105 is configured to support communications within a plurality of different communication channels, each of which may be utilized to exchange messages between a different plurality of users (and their associated user devices 101A-101N), and each plurality of users may be associated with a different team or group. The group-based communication platform 105 is thus configured for managing access to each of those communication channels such that communication channels associated with particular groups may be isolated and inaccessible to users not associated with the particular groups. Because communication channels (and the messages exchanged therein) are stored in various database shards that may not be grouped based on group identifiers, the group-based communication platform 105 utilizes a plurality of data tables for managing associations between various communication channels (e.g., for managing associations among communication channels operating within a particular group) and for managing user access to data stored in association with those communication channels. Moreover, one or more of these data tables further manages user memberships within individual channels, to associate users (and their associated user profiles) with communication channels for which the users are members.

These data tables further correlate particular group-based communication channels with particular groups (and/or enterprises, which may share various characteristics with the group designation, including the capability to be correlated with individual group-based communication channels via groups-channels data tables). This group-channel correlation is further utilized for managing user access to particular channels, and for applying group- (or enterprise-) specific parameters to individual communication channels. In certain embodiments, these parameters may be applied channel-wide, such that they apply to all members of a particular channel. In other embodiments, the parameters may be applied for members of a particular group within a channel, such that different members of a channel may be subject to different group-specific parameters if a channel is shared across multiple groups. Such implementations may result in different members of a communication channel having a different user experience (as impacted via a user device 101A-101N).

Communication Channel Storage for an Enterprise

As discussed above, an enterprise may comprise a plurality of subgroups and a plurality of users, and several communication channels may be established between members of the enterprise (and/or with users outside of the enterprise). Thus, the enterprise structure provides a hierarchical structure associated with a particular group, in which an enterprise (of which all users associated with the group may be a member of) may encompass a plurality of subgroups (of which a subset of users associated with the group may be a member of). Communication channels may be associated with the enterprise or with one or more subgroups and may still be accessible only to users associated with the group corresponding to the enterprise. Because communication channels are stored within a plurality of physically disparate database shards, the group-based communication platform 105 utilizes a plurality of data tables to relate communication channels with related groups (and enterprises), to relate communication channels with users, and to relate users with groups, subgroups, and/or enterprises.

The data tables utilized to relate communication channels with particular groups (and enterprises) may be stored in one or more group- (or enterprise-) specific database shards. Moreover, these group- (or enterprise-) specific database shards may be configured for storing group- (or enterprise-) specific policies applicable to communication channels associated with the group (or enterprise). In certain embodiments, these group- (or enterprise-) specific policies may be enacted for specific channels by referencing these group- (or enterprise-) specific policies when providing channel-specific data to particular user devices 101A-101N. In such embodiments, multiple sets of group- (or enterprise-) specific policies may be applied to a particular channel, particularly when members of the channel are also members of differing groups. Thus, when providing channel-specific data to a user device 101 associated with a given user, the user's membership in a particular group may be determined, and group- (or enterprise-) specific policies may be retrieved for the transmission to the particular user device 101.

In other embodiments, group- (or enterprise-) specific policies may be applied to particular communication channels by storing those group- (or enterprise-) specific policies within a channel-specific database shard associated with the channel. For example, when first generating a communication channel, the channel may be associated with one or more groups, and the group- (or enterprise-) specific policies may be identified and provided for storage within a channel-specific shard generated for the communication channel.

Notably, communication channels are related to groups (and/or enterprises) through a groups-channels data table such as that shown in FIG. 9. The groups-channels data table enables the group-based communication platform 105 to identify all of those channels that are associated with a particular group and their respective database shard storage location. By using the unique channel identifier to obtain additional data regarding each of those channels within a channels data table (such as that shown in FIG. 7), the group-based communication platform 105 may then retrieve data indicative of characteristics of each of those channels, as well as data indicative of the physical storage location of the database shard where the communication channel is stored. Thus, all channels associated with a given group (or enterprise) need not be stored in a common database storage location to be associated within the group-based communication platform 105. Moreover, utilizing a unique group identifier from the groups-channels data table to extract group-specific data from the group data table enables the group-based communication platform 105 to identify relationships between individual groups and larger enterprises. Thus, a communication channel identified as associated with a group may also be associated with an enterprise to which the group relates.

The group-based communication platform 105 may be configured to generate a complete listing of all communication channels associated with a particular group (or enterprise) based on the established relationships between channels and groups; and between groups and enterprises within the groups-channels data table and the group data table. Moreover, the group-based communication platform 105 may be configured to supplement the listing of channels associated with particular group (or enterprise) with data indicative of the storage location of each of those communication channels (e.g., based on Vitess keys), which may span a plurality of database shards.

Relationships between users and channels and between users and groups may be established and maintained based on other data tables utilized to establish user membership within individual communication channels, to establish eligibility to join other channels associated with the user's group (or enterprise), and/or to establish eligibility to generate channels associated with the user's group (or enterprise). For example, a channel-member data table (such as that shown in FIG. 6) may be utilized to establish a listing of members within a given channel. The group-based communication platform 105 may thus utilize this listing of channel members to determine which client devices 101A-101N are to receive messages exchanged within individual channels. Moreover, the users-group data table (such as that shown in FIG. 5) may be utilized by the group-based communication platform 105 to establish eligibility of various members to join individual communication channels. For example, a user may only be eligible to join a communication channel if the user is a member of a group that is associated with the communication channel (in certain embodiments, privacy settings of a particular communication channel may establish additional criteria for a user to join a particular communication channel). Those communication channels associated with groups that the user is not a member of are not available for the user to join. For added security, the group-based communication channel 105 is configured such that a user is not able to see or even know of the existence of communication channels that are not associated with the user's group(s), subgroup(s), and/or enterprise.

Moreover, the group-based communication platform 105 may be configured to utilize additional user data from a users data table to populate data associated with particular messages exchanged within a communication channel, and/or to provide external messages to the user, via alternative contact information (e.g., an email address).

Communication Channel Creation

The group-based communication platform is configured to create new communication channels—and corresponding channel-based database shards—upon receipt of a communication channel creation request from a client device corresponding with a user having channel creation authorization. In certain embodiments, a graphical user interface as described herein, provided to a user via a client device 101 may be configured such that only users that are authorized for channel creation have interactive user interface elements configured for initializing the channel creation process. In other embodiments, all user interfaces presented to any user (regardless of channel creation authorization privileges) comprises channel creation user interface elements. However, the group-based communication platform 105 may be configured to prevent unauthorized users from creating any channels.

In certain embodiments, a channel creation process may vary depending on whether the channel is to be utilized within a single group, within a single enterprise, across groups within a single enterprise, or between multiple groups existing within multiple enterprises.

Figure 10:
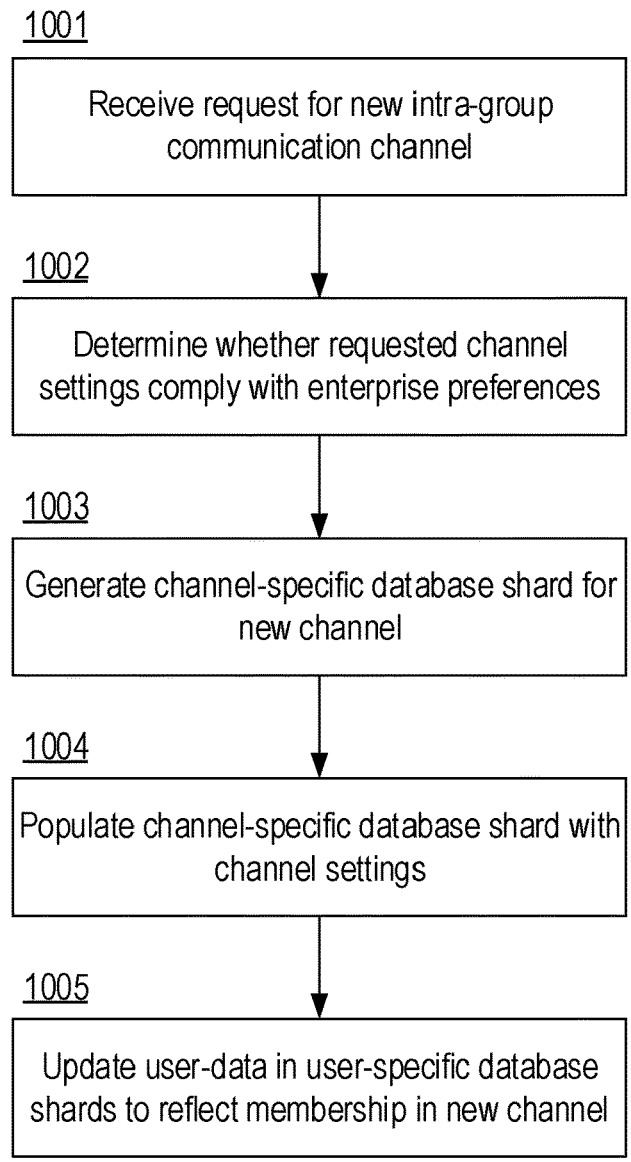
FIG. 10 is a flowchart illustrating example steps for generating an intra-group communication channel.

Generating an intra-group communication channel may proceed in accordance with the flowchart of FIG. 10. As shown therein, the process may begin as shown at Block 1001, in which a user requests to generate a new communication channel and the request is transmitted to a group-based communication platform 105. The user may interact with a corresponding element of a client device 101 user interface, such as an interactive button requesting to generate a communication channel. In certain embodiments, as a part of the initial communication channel creation request, the client device 101 may present one or more interactive fillable-fields for the user to provide various desired channel settings and/or characteristics, such as a channel name, a channel topic, one or more initial users to invite to join the channel, one or more groups to be associated with the channel, whether the channel is to be public or private, and/or the like. Upon receipt of user input for each of these channel characteristics, the client device 101 may provide this channel creation data to the group-based communication platform 105 within a channel creation request. For intra-group channels, the channel creation request identifies a single group to be associated with the channel.

Upon receipt of the channel creation request at the group-based communication platform 105, the user's authorization credentials for creating a channel are checked to determine whether the user is authorized to initiate the creation of the requested channel.

To check the user's credentials, the group-based communication platform 105 retrieves a user record within a users table stored therein. In certain embodiments, data corresponding to the user, including a user profile for the user, may be stored within a database shard corresponding to the particular user. In these and other embodiments, the user profile may be identified by the group-based communication platform based on a user identifier included with the channel creation request. In certain embodiments, upon determining that the user is not authorized to generate the requested channel, the group-based communication platform transmits a denial message to the client device 101, which may display the denial request to the user and the process ends.

Upon determining that the user is authorized to initiate the creation of a new intra-group communication channel, the group-based communication platform determines whether the requested channel settings comply with applicable enterprise-specific policies. As indicated at Block 1002, the group-based communication platform 105 retrieves applicable enterprise-specific policies for the channel creation request. The group-based communication platform 105 identifies a group to be associated with the requested channel within the channel creation request, and looks up applicable enterprise policies via one or more group data tables (which link groups with corresponding enterprises, as indicated herein). Upon identifying applicable enterprise policies, the group-based communication platform 105 retrieves those enterprise policies from a corresponding enterprise-specific database shard, and compares those enterprise policies against the requested channel settings identified within the channel creation request. In certain embodiments, the group-based communication platform 105 may automatically adjust one or more channel settings to comply with enterprise-specific policies (upon determining that those channel settings are not in compliance with applicable enterprise-specific policies). The group-based communication platform 105 may further provide an indication of the changed channel settings to the requesting client device 101 for presentation to the user. In other embodiments, the group-based communication platform 105 may request that the user adjust any channel settings that are not in compliance with applicable enterprise policies prior to proceeding to generate the new communication channel.

In certain embodiments, the group-based communication platform 105 may further determine whether the user requesting to create the channel is an administrator associated with the group to which the requested channel is to be assigned. For example, the group-based communication platform 105 may retrieve data from a group-specific database shard to identify a user identifier indicated as being an administrator for the group. The group-based communication platform may then compare the user identified received as a part of the channel creation request against the user identifier indicated as being the administrator for the applicable group. Upon determining that the user is not an administrator, the group-based communication platform may transmit an approval request to the identified group administrator to approve or deny the channel creation request. If the administrator denies the channel creation request, the process may end. However, if the administrator approves the channel creation request, the process proceeds as discussed herein.

As shown at Block 1003, upon determining that the requested channel settings comply with applicable enterprise-specific policies, the group-based communication platform 105 proceeds to create a new database shard for the requested channel. The group-based communication platform 105 may generate appropriate partitions within available (unused or underused) database storage devices to define a discrete database shard for the new channel. The group-based communication platform 105 may then populate the newly generated database shard with channel-specific data, such as the channel settings provided within the channel creation request as indicated at Block 1004.

The group-based communication platform 105 may additionally update one or more data tables to provide data indicative of the channel (e.g., a channels data table) and for associating users with the newly generated channel (a channel-member data table) and associating the channel with an applicable group and enterprise for the channel (a groups-channels data table), as indicated at Block 1005. This process may additionally comprise updating one or more user-specific database shards to provide an appropriate indication of the user's membership in the newly generated channel, and/or updating one or more group-specific database shards to provide an appropriate indication that the newly generated communication channel is available for users in a particular group. In certain embodiments, updating the user-specific database shards and/or the group-specific database shards causes updates to graphical user interfaces provided to users (via corresponding client devices 101A-101N) to indicate the availability of the newly generated communication channel for use.

Moreover, the group-based communication platform 105 is configured to generate and transmit invitations to join the newly created communication channels to other users listed within the channel creation request. Those users may be given the option to accept or decline the invitation to join. In other embodiments, the group-based communication platform 105 may automatically add those identified users as members of the newly generated channel. As a part of adding those users as members of the channel, the group-based communication platform updates user-specific database shards corresponding to each of those users to reflect the newly generated membership in the channel. In other embodiments, corresponding updates may be made to data in channel-specific database shards to update the membership listing for the particular channel.

Because enterprises are monitored and treated similarly as other groups, the process for generating an intra-enterprise channel available for all members associated with the particular enterprise (regardless of membership in groups nested within those enterprises) proceeds as described above for intra-group channels. The generated whole-enterprise channels have corresponding channel-specific database shards, and are associated with the group identifier for the particular enterprise. Thus, users associated with the same enterprise may have access to the whole-enterprise channel (assuming those members satisfy any applicable membership criteria, which may be identified within the channel settings). In certain embodiments, different criteria may apply to determine whether a user is authorized to generate a whole-enterprise channel as opposed to a channel associated with a particular group. Accordingly, when determining whether the user has authorization to generate the requested channel, the group-based communication platform 105 may query an enterprise-specific set of criteria for determining whether the user is authorized to generate a whole-enterprise communication channel (e.g., the enterprise-specific set of criteria may include a whitelist of a blacklist of users identified as authorized to generate a whole-enterprise channel, or users identified as unauthorized to generate a whole-enterprise channel, respectively).

Figure 11:
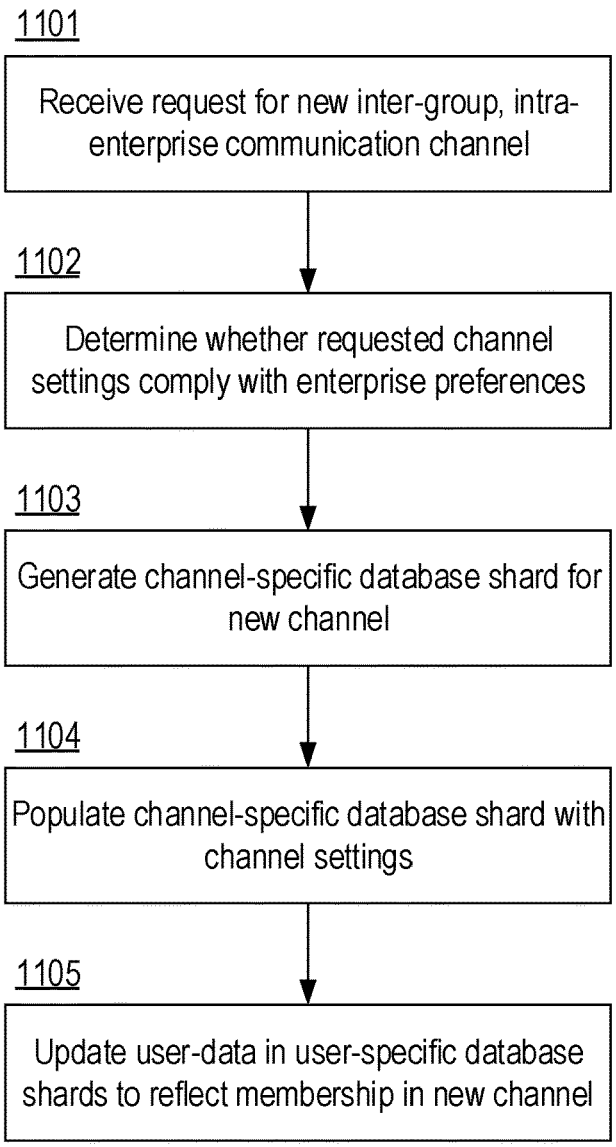
FIG. 11 is a flowchart illustrating example steps for generating an inter-group, intra-enterprise communication channel.

The process for generating an inter-group, intra-enterprise channel is described with reference to FIG. 11, which illustrates how enterprise-specific parameters remain applicable in cross-group channels. The process discussed in reference to FIG. 11 results in the creation of a channel available for access to members of a plurality of discrete, identified groups all relating to a single enterprise. In other words, only a subset of a particular enterprise's groups may be related to the generated channel.

As shown at Block 1101, a user requests to initiate creation of a new communication channel via a corresponding client device 101, and the user provides various channel characteristics, such as a channel name, a channel topic, one or more initial users to invite to join the channel, one or more groups to be associated with the channel, whether the channel is to be public or private, and/or the like. Upon receipt of user input for each of these channel characteristics, the client device 101 may provide this channel creation data to the group-based communication platform 105 within a channel creation request. For inter-group channels, the channel creation request identifies a plurality of groups to be associated with the channel. For inter-group, intra-enterprise channel creation requests, the identified plurality of groups within the channel creation request are associated with a single, common enterprise. Upon receipt of the channel creation request at the group-based communication platform 105, the user's authorization credentials for generating a channel are checked to determine whether the user is authorized to generate the requested channel. To check the user's credentials, the group-based communication platform 105 retrieves a user record within a users table stored therein. In certain embodiments, data corresponding to the user, including a user profile for the user, may be stored within a database shard corresponding to the particular user. In these and other embodiments, the user profile may be identified by the group-based communication platform based on a user identifier included with the channel creation request. In certain embodiments, upon determining that the user is not authorized to initiate the creation of the requested channel, the group-based communication platform transmits a denial message to the client device 101, which may display the denial request to the user and the process ends.

Upon determining that the user is authorized to initiate the creation of a new inter-group, intra-enterprise communication channel, the group-based communication platform determines whether the requested channel settings comply with applicable enterprise-specific policies. As indicated at Block 1102, the group-based communication platform 105 retrieves applicable enterprise-specific policies for the channel creation request. The group-based communication platform 105 identifies groups to be associated with the requested channel within the channel creation request, and looks up applicable enterprise policies via groups data tables (which link groups with corresponding enterprises, as indicated herein). Upon identifying applicable enterprise policies, the group-based communication platform 105 retrieves those enterprise policies from a corresponding enterprise-specific database shard, and compares those enterprise policies against the requested channel settings identified within the channel creation request. In certain embodiments, the group-based communication platform 105 may automatically adjust one or more channel settings to comply with enterprise-specific policies (upon determining that those channel settings are not in compliance with applicable enterprise-specific policies). The group-based communication platform 105 may further provide an indication of the changed channel settings to the requesting client device 101 for presentation to the user. In other embodiments, the group-based communication platform 105 may request that the user adjust any channel settings that are not in compliance with applicable enterprise policies prior to proceeding to generate the new communication channel.

In certain embodiments, the group-based communication platform 105 may further determine whether the user requesting to create the channel is an administrator associated with one of the groups to which the requested channel is to be assigned. For example, the group-based communication platform 105 may retrieve data from a group-specific database shard to identify a user identifier indicated as being an administrator for each group identified within the channel creation request. The group-based communication platform may then compare the user identified received as a part of the channel creation request against the user identifiers indicated as being the administrators for the applicable groups. Upon determining that the user is not an administrator, the group-based communication platform may transmit an approval request to each of the identified group administrators to approve or deny the channel creation request. Even upon determining that the user is an administrator of a subset of the identified groups, the group-based communication platform 105 transmits an approval request to each of the other identified group administrators to approve or deny the channel creation request. If one or more of the identified administrators deny the channel creation request, the process may end. However, if all of the identified administrators approve the channel creation request, the process proceeds as discussed herein.

As shown at Block 1103, upon determining that the requested channel settings comply with applicable enterprise-specific policies, the group-based communication platform 105 proceeds to generate a new database shard for the requested channel. The group-based communication platform 105 may generate appropriate partitions within available (unused or underused) database storage devices to define a discrete database shard for the new channel. The group-based communication platform 105 may then populate the newly generated database shard with channel-specific data, such as the channel settings provided within the channel creation request as indicated at Block 1104.

The group-based communication platform 105 may additionally update one or more data tables to identify the newly created channel (e.g., a channels data table), for associating users with the newly generated channel (e.g., a channel-member data table), and for associating the channel with the applicable groups and enterprise for the channel (e.g., a groups-channels data table), as indicated at Block 1105. This process may additionally comprise updating one or more user-specific database shards to provide an appropriate indication of the user's membership in the newly generated channel, and/or updating a plurality of group-specific database shards to provide an appropriate indication that the newly generated communication channel is available for users in the particular groups. Because the channel is associated with a plurality of groups, the data linking the channel with groups is present in a plurality of group-specific database shards. As a result, a groups-channels data table may include a plurality of table entries linking the channel with groups, with each table entry linking the newly generated channel with a single group. In certain embodiments, updating the user-specific database shards and/or the group-specific database shards causes updates to graphical user interfaces provided to users (via corresponding client devices 101A-101N) to indicate the availability of the newly generated communication channel for use.

Moreover, the group-based communication platform 105 is configured to generate and transmit invitations to join the newly generated communication channels to other users listed within the channel creation request. Those users may be given the option to accept or decline the invitation to join. In other embodiments, the group-based communication platform 105 may automatically add those identified users as members of the newly generated channel. As a part of adding those users as members of the channel, the group-based communication platform updates user-specific shards corresponding to each of those users to reflect the newly generated membership in the channel. In other embodiments, corresponding updates may be made to data in channel-specific shards to update the membership listing for the particular channel.

Figure 12:
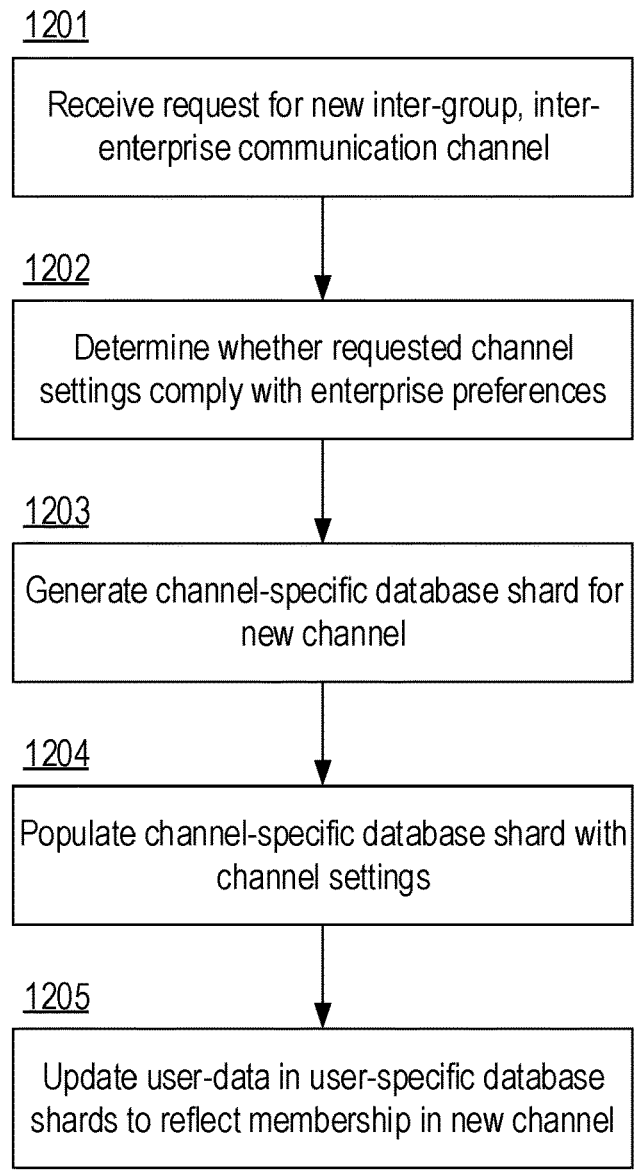
FIG. 12 is a flowchart illustrating example steps for generating an inter-enterprise communication channel.

Creation of an inter-group, inter-enterprise channel is described with reference to FIG. 12. The process discussed in reference to FIG. 12 results in the creation of a channel available for access to members of a plurality of discrete, identified groups relating to separate enterprises. In other words, users associated with different enterprises may access the created channel so long as those users are associated with groups linked with the particular channel. It should be understood that identical processes may be utilized for creating an inter-enterprise channel available to all users of each of a plurality of enterprises.

As shown in Block 1201, a user requests to create a new communication channel via a corresponding client device 101, and the user provides various channel characteristics, such as a channel name, a channel topic, one or more initial users to invite to join the channel, one or more groups to be associated with the channel, one or more enterprises to be associated with the channel, whether the channel is to be public or private, and/or the like. Upon receipt of user input for each of these channel characteristics, the client device 101 may provide this channel creation data to the group-based communication platform 105 within a channel creation request. For inter-group, inter-enterprise channels, the channel creation request identifies a plurality of groups to be associated with the channel and a plurality of enterprises to be associated with the channel. Upon receipt of the channel creation request at the group-based communication platform 105, the user's authorization credentials for generating a channel are checked to determine whether the user is authorized to initiate the creation of the requested channel (it should be understood that certain users may be authorized to initiate the creation of intra-enterprise channels but not to initiate the creation of inter-enterprise channels). To check the user's credentials, the group-based communication platform 105 retrieves a user record within a users data table stored therein. In certain embodiments, data corresponding to the user, including a user profile for the user, may be stored within a database shard corresponding to the particular user. In these and other embodiments, the user profile may be identified by the group-based communication platform based on a user identifier included with the channel creation request. In certain embodiments, upon determining that the user is not authorized to generate the requested channel, the group-based communication platform transmits a denial message to the client device 101, which may display the denial request to the user and the process ends.

Upon determining that the user is authorized to initiate the creation of a new inter-group, inter-enterprise communication channel, the group-based communication platform determines whether the requested channel settings comply with applicable enterprise-specific policies for each of the plurality of enterprises associated with the channel. As indicated at Block 1202, the group-based communication platform 105 retrieves applicable enterprise-specific policies for the channel creation request. The group-based communication platform 105 identifies groups to be associated with the requested channel within the channel creation request, and looks up applicable enterprise policies via group data tables (which link groups with corresponding enterprises, as indicated herein). Upon identifying applicable enterprise policies for the plurality of enterprises associated with the channel creation request, the group-based communication platform 105 retrieves those enterprise policies from corresponding enterprise-specific database shards, and compares those enterprise policies against the requested channel settings identified within the channel creation request. In certain embodiments, the group-based communication platform 105 may automatically adjust one or more channel settings to comply with enterprise-specific policies (upon determining that those channel settings are not in compliance with applicable enterprise-specific policies for at least one of the identified enterprises). The group-based communication platform 105 may further provide an indication of the changed channel settings to the requesting client device 101 for presentation to the user. In other embodiments, the group-based communication platform 105 may request that the user adjust any channel settings that are not in compliance with applicable enterprise policies prior to proceeding to generate the new communication channel.

In certain embodiments, a single channel may be associated with a plurality of sets of channel settings to comply with enterprise-specific policies for a plurality of enterprises. In such embodiments, the channel settings may be applied when providing data to particular client devices 101A-101N depending on associations between the client device 101 (and the associated user) and groups/enterprises. For example, a first client device 101 associated with a first enterprise may be subject to a first set of channel settings, and a second client device 101 associated with a second enterprise may be subject to a second set of channel settings. These one-sided sets of channel settings may define various characteristics of the channel as experienced by users. For example, the channel settings may define whether emojis are available for use in the channel (users accessing the channel from the perspective of a first enterprise may be able to view shared emojis, and users accessing the channel from the perspective of a second enterprise may see emojis as a placeholder character (e.g., a blank square, a square with an included question mark, and/or the like), may define how data is transmitted to client devices, whether particular external apps are accessible to the users within the channel, and/or the like.

In certain embodiments, the group-based communication platform 105 may further determine whether the user requesting to create the channel is an administrator associated with one of the groups (and/or enterprises) to which the requested channel is to be assigned. For example, the group-based communication platform 105 may retrieve data from a group-specific database shard to identify a user identifier indicated as being an administrator for each group identified within the channel creation request. The group-based communication platform may then compare the user identified received as a part of the channel creation request against the user identifiers indicated as being the administrators for the applicable groups. Upon determining that the user is not an administrator, the group-based communication platform may transmit an approval request to each of the identified group administrators to approve or deny the channel creation request. Even upon determining that the user is an administrator of a subset of the identified groups, the group-based communication platform 105 transmits an approval request to each of the other identified group administrators to approve or deny the channel creation request. If one or more of the identified administrators deny the channel creation request, the process may end. However, if all of the identified administrators approve the channel creation request, the process proceeds as discussed herein.

As shown at Block 1203, upon determining that the requested channel settings comply with applicable enterprise-specific policies (and/or upon generating one-sided channel settings for each enterprise associated with the channel), the group-based communication platform 105 proceeds to generate a new database shard for the requested channel. The group-based communication platform 105 may generate appropriate partitions within available (unused or underused) database storage devices to define a discrete database shard for the new channel. The group-based communication platform 105 may then populate the newly generated database shard with channel-specific data, such as the channel settings provided within the channel creation request as indicated at Block 1204.

The group-based communication platform 105 may additionally update one or more data tables for identifying the newly created channel (e.g., a channels data table), for associating users with the newly generated channel (e.g., a channel-member data table), and for associating the channel with the applicable groups and enterprise for the channel (e.g., a groups-channels data table), as indicated at Block 1205. This process may additionally comprise updating one or more user-specific database shards to provide an appropriate indication of the user's membership in the newly created channel, and/or updating a plurality of group-specific database shards to provide an appropriate indication that the newly created communication channel is available for users in the particular groups. Because the channel is associated with a plurality of groups and enterprises, the data linking the channel with groups is present in a plurality of group-specific database shards. As a result, a groups-channels data table may include a plurality of table entries linking the channel with groups, with each table entry linking the newly generated channel with a single group. In certain embodiments, updating the user-specific database shards and/or the group-specific database shards causes updates to graphical user interfaces provided to users (via corresponding client devices 101A-101N) to indicate the availability of the newly generated communication channel for use.

Moreover, the group-based communication platform 105 is configured to generate and transmit invitations to join the newly created communication channels to other users listed within the channel creation request. Those users may be given the option to accept or decline the invitation to join. In other embodiments, the group-based communication platform 105 may automatically add those identified users as members of the newly created channel. As a part of adding those users as members of the channel, the group-based communication platform updates user-specific shards corresponding to each of those users to reflect the newly generated membership in the channel. In other embodiments, corresponding updates may be made to data in channel-specific shards to update the membership listing for the particular channel.

In certain embodiments, channels may be converted between various channel types without changing the data storage location of the channels. For example, a channels may be converted between intra-group, intra-enterprise channels; inter-group, intra-enterprise channels; and inter-group, inter-enterprise channels by simply adjusting channel settings and/or removing or adding members of the channel. For example, channel characteristics may be modified (e.g., by a channel or group administrator) to add additional groups to be associated with a channel (either within a single enterprise or associated with multiple enterprises). Upon the additional of new groups having access to the channel, the group-based communication platform 105 may review the channel settings to determine whether those channels comply with applicable enterprise policies for inter-group channels, and/or to generate one or more approval requests for one or more group administrators relating to the groups that will have access to the channel (e.g., the current group and/or the newly added group). Upon determining that the channel complies with applicable enterprise-specific policies and, if applicable, approval has been received from applicable group administrators, data stored in the channel-specific database shard is updated to reflect the new group associations, and data stored in group-specific database shards are updated to reflect the new channel access. Additional members may then be added from the newly added group, and data stored in user-specific database shards may be updated to reflect the new channel membership once joined.

When removing a group from access to a particular channel, all members of the group that are only associated with the group to be removed are removed from the membership list of that channel. Moreover, the group-based communication platform 105 may be configured to request authorization to remove a group from the channel access listing from one or more group administrators of groups associated with the channel. In certain embodiments, the group-based communication platform may be further configured to determine whether the channel remains in compliance with applicable enterprise-specific policies (e.g., policies for intra-group channels may differ from inter-group channels, and accordingly changing the channel from an inter-group channel to an intra-group channel may subject the channel to different enterprise policies).

Moreover, when removing a group from access to a particular channel, the group-based communication platform 105 may update data within the channel-specific database shard to remove the group therefrom, and to update data within the newly removed group's group-specific database shard to remove access indications from the group-specific database shard. Such updates may cause corresponding updates to groups-channels data tables reflecting the newly removed group.

In certain embodiments, the group-based communication platform 105 may be configured to reassign a particular channel to an entirely new group. As just one example of where such a feature may be usable, a channel originally assigned to a particular group within an enterprise may be promoted to be an all-enterprise channel. Thus, the channel may be originally associated with a single group identifier corresponding to the original group, and the group-based communication platform 105 may replace the single group identifier with a group identifier associated with the enterprise. When making such a change, data stored in a channel-specific database shard may be updated to reflect the new group identifier associated with the channel, data within a group-specific database shard corresponding to the original group may be updated to remove the channel identifier from association with the group, and data stored in a group-specific database shard corresponding to the enterprise (also known as an enterprise-specific database shard) may be updated to reflect the addition of the channel identifier. Where applicable, the group-based communication platform may be further configured to update one or more user-specific database shards to remove channel membership from those user-specific database shards, if the user is not a member of the newly assigned group. However, following the above example, where a user is a member of both the original group associated with the channel and the new group associated with the channel, no data stored within a corresponding user-specific database shard need be updated. With specific reference to the above example (promoting a channel from group-specific to enterprise-wide), all members of the original group are also members of the enterprise, because the original group (and all of its members) were originally associated with the enterprise. Accordingly, all of the original members of the channel remain members of the channel after the transition from a group-specific channel to an enterprise-wide channel.

External Applications

In certain embodiments, one or more external applications may be installed and used in communication channels. These external applications may be installed in channel-specific database shards (subject to rules dictating whether enterprise policies enable the installation and/or use of such external applications), thereby enabling access to data stored therein by the external applications. In certain embodiments, these external applications may be at least partially executable via third-party computing systems, and in such cases installation of these external applications may comprise providing the third party applications with a token enabling the external application to access data stored in the channel-specific database shard.

In certain embodiments, external applications may be further installed or otherwise associated with particular groups, enterprises, and/or users. In such embodiments, external applications (or indications thereof) may be stored in corresponding group-specific database shards, enterprise-specific database shards, user-specific database shards, and/or the like. In such embodiments, to enable a particular external application to be executable with respect to a particular channel, the group-based communication platform may utilize one or more data tables associating channels with particular groups, enterprises, and/or users to determine whether a particular external application should be usable with a particular channel, for a particular user. Thus, multiple users having access to the same communication channel may have access to different external applications for the particular channel. This may be particularly applicable in inter-enterprise channels, in which each enterprise may have access to different external applications for their users.

Access Management

The group-based communication platform 105 may be configured to facilitate access management for particular users. Access management may ensure users maintain appropriate access privileges to particular channels (and corresponding channel shards) associated with the users' group and/or enterprise membership and ensures that data exchanged within particular channels (and stored within corresponding channel shards) are disseminated to appropriate client devices 101 based at least in part on channel membership of particular users. As a general example, users may have access to view (determine the existence of) and/or access to request to join channels associated with groups and/or enterprises for which the user is a member based at least in part on the user's membership in particular groups and/or enterprises, as identified within a user-specific database shard corresponding to the individual user. Moreover, the group-based communication platform 105 may be further configured to disseminate messages and/or exchanged data within particular channels to particular client devices 101A-101N (and/or to otherwise provide access to messages and/or exchanged data within particular channels) based on channel memberships (e.g., as identified within the user-specific shards corresponding to particular user identifiers associated with those particular client devices 101A-101N).

As noted above, channels may be reassigned to different groups, enterprises, and/or the like without moving corresponding, channel-specific database shards for those channels. Similarly, users may be assigned, reassigned, moved, and/or the like between and among various channels, groups, enterprises, and/or the like without generating or moving user-specific database shards for the user. Finally, characteristics of groups, as well as assignments between particular groups and enterprises may be easily modified as needed without changing the location of group-specific database shards for those specific groups. Because relationships between users, groups, enterprises, and channels are dictated by relational data stored in corresponding database shards (and within corresponding relational data tables usable by the group-based communication platform 105), these relationships may be easily modified by simply changing the contents of the relational data within appropriate storage locations.

Initiation of changes to relational data between users, groups, enterprises, and/or channels is initiated by a request generated at a client device 101. In certain embodiments, administrators may have access to access management functionalities of the group-based communication platform 105, thereby enabling administrator users to generate access management modification requests corresponding to the group, channel, and/or enterprise for which the user is assigned administrative privileges. In other embodiments, all users (regardless of administrative access privileges) may generate access management requests, although those access management requests may be subject to the approval of one or more applicable administrative users for a particular group, enterprise, and/or channel.

Access management requests relating to individual users may be generated to add a user to a channel, to add a user to a group, to add a user to an enterprise, to remove a user from a channel, to remove a user from a group, or to remove a user from an enterprise. It should be understood that combinations of these options may be utilized to "move" a user from a first group to a second group, from a first enterprise to a second enterprise, and/or the like.

To add a new user to a channel, an access management request embodied as a channel access request may be generated at a client device 101 (e.g., the client device 101 of the user requesting access to the channel). In certain embodiments, the group-based communication interface is configured such that the client device 101 may only generate channel access requests for channels associated with the user's associated group(s) and/or enterprise(s). In such embodiments, the group-based communication interface is configured for providing a list to the user of available channels for which the user may request to join (this list may comprise all available channels for which the user may request to join, or a subset of available channels, for example, complying with a user-provided channel query to search for one or more channels complying with the channel query). The user may provide user input to the client device 101 selecting one of the displayed channels, which may generate a channel access request for the selected channel.

In certain embodiments, the displayed list of available channels comprises at least a subset of channel settings reflected in corresponding channel database shards. Thus, when populating the list of available channels, the group-based communication platform 105 generates a composite listing of channels, including data obtained from each of a plurality of discrete database shards, based on the user's membership in group(s) and/or enterprise(s). The listing of available channels includes channels that are associated with one or more groups and/or enterprises for which the user is associated. The group-based communication platform 105 is thus configured to obtain data of the user's membership in particular groups and/or enterprises from the user-specific database shard corresponding to the user (and/or from group-specific database shards corresponding to various groups or enterprises).

The access management request may identify the user identifier requesting access to the channel, and the channel identifier of the requested channel. This access management request may be transmitted to the group-based communication platform 105, which is configured to determine whether the user is authorized to access the requested channel. The group-based communication platform 105 may thus query the user profile (e.g., stored within a user-specific database shard) for the user, and the channel settings (e.g., stored within a channel-specific database shard) for the channel to determine whether the user is a member of a group having access to the requested channel. Specifically, the group-based communication platform 105 may review group membership for the user as defined in the user-specific database shard and group associations for the channel as defined in the channel-specific database shard to determine whether the user should be granted access to the channel. In embodiments in which the channel settings dictate, the group-based communication platform 105 may further transmit an authorization request to the administrator of the channel to determine whether the user should be approved for access to the channel. If the user is authorized to access the channel (e.g., based on group-membership and/or based on a received authorization approval from a channel administrator), the user data stored in the user-specific database shard is updated to reflect the new membership in the requested channel, and channel data stored in the channel-specific database shard corresponding to the channel is updated to reflect the newly added member. Thereafter, the user (via a client device 101) has access to data exchanged within the channel and/or stored within the channel shard corresponding to the channel. Data stored with the channel shard may be provided to the user's client device 101 based on a determination that the user is a member of the channel (e.g., as reflected in user data stored in a user-specific database shard and/or as reflected in a channel-members data table).

To remove a user from a channel, an access management request may be generated at a client device 101 (e.g., a client device 101 associated with a channel administrator). The access management request may identify the user identifier to be removed from the channel and the corresponding channel identifier. The access management request may be transmitted to the group-based communication platform 105, which is configured to update user data stored in the user-specific database shard corresponding to the identified user to reflect the removed membership in the corresponding channel, and channel data stored in the channel-specific database shard corresponding to the applicable channel is updated to reflect the newly removed member.

To add a new user to a group (or enterprise), an access management request may be generated at a client device 101 (e.g., the client device 101 of the user requesting access to the group; a client device 101 associated with user having administrative privileges over the group to be joined; and/or the like). The access management request may identify the user identifier requesting access to the group, and the group identifier of the requested group. This access management request may be transmitted to the group-based communication platform 105, which is configured to determine whether the user is authorized to access the requested group. The group-based communication platform 105 may thus query the user profile (e.g., stored within a user-specific database shard) for the user, and the group-specific policies (e.g., stored within a group-specific database shard) for the group to determine whether the user is a member of an enterprise encompassing the requested group, or whether the user is otherwise authorized to access the requested group (e.g., based on an approval from the group administrator). As a specific example, the group-based communication platform 105 may review enterprise membership for the user as defined in the user-specific database shard, and enterprise associations for the group as defined in the group-specific database shard to determine whether the user should be granted access to the group. In embodiments in which the group-specific policies dictate, the group-based communication platform 105 may further transmit an authorization request to the administrator of the group to determine whether the user should be approved for access to the group. If the user is authorized to access the group (e.g., based on enterprise membership and/or based on a received authorization approval from a group administrator), the user data stored in the user-specific database shard is updated to reflect the new membership in the requested group, and the group-data stored in the group-specific database shard corresponding to the group is updated to reflect the newly added member.

To remove a user from a group (or enterprise), an access management request may be generated at a client device 101 (e.g., a client device 101 associated with a group administrator). The access management request may identify the user identifier to be removed from the group and the corresponding group identifier. The access management request may be transmitted to the group-based communication platform 105, which is configured to update user data stored in the user-specific database shard corresponding to the identified user to reflect the removed membership in the corresponding group, and channel data stored in the group-specific database shard corresponding to the applicable group is updated to reflect the newly removed member.

Client Device Interactions

A client device 101 associated with a user (e.g., utilized by the user to access the group-based communication platform 105) may be configured to provide data regarding various groups, enterprises, and channels for which the user is a member.

Data provided from the group-based communication platform 105 to the client device 101 may be provided via a websocket connection (e.g., established between the client device 101 and the interface computing entity 109). In certain embodiments, a plurality of websocket connections may be established between a single client device 101 and the group-based communication platform 105. Each websocket may be associated with a particular group (e.g., such that messages exchanged over communication channels associated with a particular group are all transmitted to the client device 101 via a shared websocket connection), a particular communication channel, and/or the like.

The client device 101 provides data (e.g., messages exchanged over one or more communication channels) to the user via the communication channel interface. The communication channel interface may be embodied as a group-based (or enterprise-based) user interface, such that all communication channels associated with a particular group and that the user is a member of, are included within a combined user interface. The client device 101 may be configured to switch between multiple group-based user interfaces in circumstances in which a user is a member of a plurality of groups.

The group-based user interface may comprise a channel listing of all communication channels for which the user is a member of, and which relate to the particular group of the user interface. This listing may be generated based at least in part on data stored within the channel-members data table (e.g., as shown in FIG. 6) and/or the groups-channels data table (e.g., as shown in FIG. 9). As displayed within the group-based user interface of the client device 101, the channel listing may be interactive, such that selecting a particular channel within the channel listing causes the client device 101 to display messages exchanged between users within the selected channel. Because data associated with each communication channel may be stored within physically distinct database shards, selecting between a plurality of communication channels included within the channel listing causes the client device 101 to display data retrieved from physically different database shards stored at the group-based communication platform 105. Moreover, the channels listing may be configured to display notifications, for example, regarding updates (e.g., new messages) within a particular communication channel. These notifications may be displayed simultaneously. Because the channel listing comprises a listing of channels stored in physically discrete database shards, the group-based communication interface may be configured to provide notifications regarding data stored within a plurality of physically discrete database shards simultaneously.

It should be understood that other display configurations may be utilized to provide data to a user via a client device 101. In certain embodiments, the channel listing within a group-based user interface may comprise one or more channels not associated with the particular group. For example, a user may pin one or more communication channels within a listing of favorite channels, which may include channels associated with a plurality of groups. The client device 101 may be configured to include this listing of favorite channels as a portion of a channel listing in a plurality of group-based user interfaces. In such embodiments, the channel listing may provide a visual distinction between channels associated with different groups (e.g., the textual representation of each channel within the channel listing may be displayed in a group-specific color; each channel may have an associated group-specific icon/symbol, and/or the like).

The group-based communication interface may further comprise a message display portion configured to provide a listing of messages (e.g., in chronological order, by threads, and/or the like) exchanged within a selected communication channel. This message display portion may be displayed as a separate pane within the group-based communication interface adjacent to a channel listing pane (each of these panes may be independently navigable, such as being independently scrollable).

Messages displayed within the message display portion for a particular communication channel may be those messages stored within the specific database shard storage area for the communication channel. Thus, messages displayed within the message display portion are retrieved (e.g., by message distribution servers 107A-107N) from the database shard corresponding to the particular communication channel, and are passed to the client device 101 (e.g., via the websocket connection established between the client device 101 and the interface computing entity 109).

Similarly, messages generated at the client device 101 for dissemination to other members of a communication channel are transmitted from the client device 101 to the group-based communication platform 105 (e.g., via a websocket connection established between the client device 101 and the interface computing entity 109). As discussed above, those messages may be transmitted with metadata indicative of the channel in which the message was transmitted. Once received at the message distribution servers 107A-107N (e.g., after being passed from the interface computing entity 109 to the message distribution servers 107A-107N), the message distribution servers 107A-107N identify the communication channel in which the message was sent, lookup the corresponding database shard for the communication channel from the one or more data tables, and store the message within the corresponding database shard. Moreover, the message distribution servers 107A-107N may additionally look up the other members of the communication channel within the data tables, and may disseminate the message to client devices 101A-101N associated with those other channel members (e.g., for display within group-based communication interfaces of those other client devices 101A-101N.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A group-based data storage system accessible by a plurality of client devices, the group-based data storage system comprising:
a plurality of discrete physical database storage devices each defining a database, wherein each of the plurality of discrete physical database storage devices encompass at least one non-transitory computer-readable storage medium, and wherein each database is sharded into a plurality of data shards collectively comprising:
channel-specific shards each having an associated channel identifier;
group-specific shards each having an associated group identifier; and
user-specific shards each having an associated user identifier; and
a remote computing platform comprising at least a processor and a memory having computer coded instructions therein, and wherein, when executed by the processor, the computer coded instructions cause the processor to correlate each channel identifier with one or more group identifiers and shard the plurality of discrete physical database storage devices to generate new data shards of the plurality of data shards by:
receiving a channel creation request from a client device associated with a given user identifier;
generating a new channel-specific shard within one of the plurality of discrete physical database storage devices corresponding to the channel creation request;
populating the new channel-specific shard with linking data linking the new channel-specific shard with one or more linked group-specific shards of the one or more group-specific shards and one or more linked user-specific shards of the one or more user-specific shards; and
populating the one or more linked group-specific shards and the one or more linked user-specific shards with data identifying the new channel-specific shard; and
wherein the computer coded instructions of the remote computing platform further cause the processor to control access to each of the plurality of channel-specific shards based at least in part on linking data associated with each channel-specific shard, channel membership, and group membership by:
receiving an access request from the client device to access data stored on one or more channel-specific shards;
determining channel membership and group membership for the client device;
providing the client device with access to data stored in one or more channel-specific shards having associated channel identifiers and group identifiers matching the determined channel membership and group membership for the client device.

2. The group-based data storage system of claim 1, wherein the one or more linked group-specific shards are linked with a plurality of channel-specific shards stored on a plurality of discrete physical database storage devices.

3. The group-based data storage system of claim 2, wherein:
the group-specific shards comprise first group-specific shards each corresponding to an enterprise group and second group-specific shards each corresponding to a subgroup;
each of the second group-specific shards comprise hierarchy data comprising a group identifier corresponding to one of the first group-specific shards; and
the linking data links the new shard with one or more of the second group-specific shards.

4. The group-based data storage system of claim 3, wherein each of the first group-specific shards comprise data indicative of enterprise channel creation parameters, and wherein the computer coded instructions of the remote computing platform further cause the processor to populate the new shard with data indicative of one or more of the enterprise channel creation parameters.

5. The group-based data storage system of claim 1, wherein the computer coded instructions of the remote computing platform enforce access control to the new shard by:
   enforcing a first access level for users based on the linked group-specific shards; and
   enforcing a second access level for users based on the linked user-specific shards.

6. The group-based data storage system of claim 5, wherein each of the one or more linked group-specific shards identifies user-specific shards corresponding to members of the group-specific shard, and wherein the first access level enables members of the one or more linked group-specific shards to view identifying data corresponding to the new shard.

7. The group-based data storage system of claim 5, wherein the second access level enables users associated with each of the one or more linked user-specific shards to access contents of the new shard.

8. The group-based data storage system of claim 1, wherein the remote computing platform is embodied as a group-based communication platform for message exchange between the plurality of client devices.

9. A computer program product for managing a group-based storage system accessible via a plurality of client devices, the computer program product comprising at least one non-transitory computer-readable storage medium having computer-readable program code portions stored therein, the computer-readable program code portions comprising an executable portion, wherein when executed by a processor the executable portion causes the processor to:
   shard a plurality of databases defined by discrete physical database storage devices into a plurality of data shards comprising:
   channel-specific shards each having an associated channel identifier;
   group-specific shards each having an associated group identifier; and
   user-specific shards each having an associated user identifier;
   wherein sharding the plurality of discrete physical database storage devices comprises:
   receiving a channel creation request from a client device associated with a given user identifier;
   generating a new channel-specific shard within one of the plurality of discrete physical database storage devices corresponding to the channel creation request;
   populating the new channel-specific shard with linking data linking the new channel-specific shard with one or more linked group-specific shards of the one or more group-specific shards and one or more linked user-specific shards of the one or more user-specific shards; and
   populating the one or more linked group-specific shards and the one or more linked user-specific shards with data identifying the new shard;
   correlate each channel identifier with one or more group identifiers; and
   control access to each of the plurality of channel-specific shards based at least in part on linking data associated with each channel-specific shard, channel membership, and group membership by:
   receiving an access request from the client device to access data stored on one or more channel-specific shards;
   determining channel membership and group membership for the client device;
   providing the client device with access to data stored in one or more channel-specific shards having associated channel identifiers and group identifiers matching the determined channel membership and group membership for the client device.

10. The computer program product of claim 9, wherein the one or more linked group-specific shards are linked with a plurality of channel-specific shards stored on a plurality of discrete physical database storage devices.

11. The computer program product of claim 10, wherein:
   the group-specific shards comprise first group-specific shards each corresponding to an enterprise group and second group-specific shards each corresponding to a subgroup;
   each of the second group-specific shards comprise hierarchy data comprising a group identifier corresponding to one of the first group-specific shards; and
   the linking data links the new shard with one or more of the second group-specific shards.

12. The group-based data storage system of claim 11, wherein each of the first group-specific shards comprise data indicative of enterprise channel creation parameters, and wherein sharding the plurality of discrete physical database storage devices further comprises populating the new shard with data indicative of one or more of the enterprise channel creation parameters.

13. The computer program product of claim 9, wherein the computer-readable program code portions comprising an executable portion enforce access control to the new shard by:
   enforcing a first access level for users based on the linked group-specific shards; and
   enforcing a second access level for users based on the linked user-specific shards.

14. The computer program product of claim 13, wherein each of the one or more linked group-specific shards identifies user-specific shards corresponding to members of the group-specific shard, and wherein the first access level enables members of the one or more linked group-specific shards to view identifying data corresponding to the new shard.

15. The computer program product of claim 13, wherein the second access level enables users associated with each of the one or more linked user-specific shards to access contents of the new shard.

16. A group-based data storage system accessible by a plurality of client devices, the group-based data storage system comprising:
   a plurality of discrete physical database storage devices each defining a database, wherein each of the plurality of discrete physical database storage devices encompass at least one non-transitory computer-readable storage medium, and wherein each database is sharded into a plurality of data shards collectively comprising:
   a plurality of channel shards each having an associated channel identifier of a plurality of channel identifiers and each storing data exchanged between client devices in association with the channel identifier and each storing channel settings in association with a corresponding channel identifier and identifying one or more group identifiers associated with the corresponding channel identifier;
   a plurality of group shards each corresponding to a single group identifier, wherein each group shard of the plurality of group shards stores data indicative of channel creation authorization for new channels associated with the group shard and stores group policies for the single group identifier; and a plurality of user shards each having an associated user identifier of a plurality of user identifiers and each user shard identifying channel membership and group membership for the associated user identifier; and a remote computing platform comprising at least a processor and a memory having computer coded instructions therein, and wherein, when executed by the processor, the computer coded instructions cause the processor to:

control channel creation authorization for new channel shards requested by a client device associated with a particular user identifier of the plurality of user identifiers based at least in part on a group shard of the plurality of group shards corresponding with the particular user identifier; and maintain compliance of channel settings associated with new channels relative to group policies associated with group identifiers that are associated with corresponding channel identifiers.

17. The group-based data storage system of claim 16, wherein data indicative of channel creation authorization stored within each group shard comprises data indicative of one or more user identifiers authorized for channel creation.

18. The group-based data storage system of claim 16, wherein the plurality of group shards comprises a plurality of first group shards relating to enterprise groups, and a plurality of second group shards relating to subgroups; and wherein:

each of the second group shards comprises enterprise data identifying a group identifier corresponding to one of the first group shards relating to an associated enterprise group; and wherein data indicative of channel creation authorization for new channels associated with each of the second group shards at least partially matches data indicative of channel creation authorization for new channels associated with the one of the first group shards relating to the associated enterprise group.

19. A computer program product for managing a group-based storage system accessible via a plurality of client devices, the computer program product comprising at least one non-transitory computer-readable storage medium having computer-readable program code portions stored therein, the computer-readable program code portions comprising an executable portion, wherein when executed by a processor the executable portion causes the processor to:

shard a plurality of databases defined by discrete physical database storage devices into a plurality of data shards comprising:

a plurality of channel shards each having an associated channel identifier of a plurality of channel identifiers and each storing data exchanged between client devices in association with the channel identifier and each storing channel settings in association with a corresponding channel identifier and identifying one or more group identifiers associated with the corresponding channel identifier;

a plurality of group shards each corresponding to a single group identifier, wherein each group shard of the plurality of group shards stores data indicative of channel creation authorization for new channels associated with the group shard and stores group policies for the single group identifier; and a plurality of user shards each having an associated user identifier of a plurality of user identifiers and each user shard identifying channel membership and group membership for the associated user identifier;

control channel creation authorization for new channel shards requested by a client device associated with a particular user identifier of the plurality of user identifiers based at least in part on a group shard of the plurality of group shards corresponding with the particular user identifier; and maintain compliance of channel settings associated with new channels relative to group policies associated with group identifiers that are associated with corresponding channel identifiers.

20. The computer program product of claim 19, wherein data indicative of channel creation authorization stored within each group shard comprises data indicative of one or more user identifiers authorized for channel creation.

21. The computer program product of claim 19, wherein the plurality of group shards comprises a plurality of first group shards relating to enterprise groups, and a plurality of second group shards relating to subgroups; and wherein:

each of the second group shards comprises enterprise data identifying a group identifier corresponding to one of the first group shards relating to an associated enterprise group; and wherein data indicative of channel creation authorization for new channels associated with each of the second group shards at least partially matches data indicative of channel creation authorization for new channels associated with the one of the first group shards relating to the associated enterprise group.

\* \* \* \* \*